(12) United States Patent
Schine et al.

(10) Patent No.: US 7,940,677 B2
(45) Date of Patent: May 10, 2011

(54) ARCHITECTURE FOR OPTICAL METRO ETHERNET SERVICE LEVEL AGREEMENT (SLA) MANAGEMENT

(75) Inventors: Bruce A. Schine, San Leandro, CA (US); Gerald P. Agnew, Waukesha, WI (US); Christopher Kallaos, Ballwin, MO (US); Sujay Kumar Mereddy, Pleasanton, CA (US); Paul A. Tomalenas, Alamo, CA (US); Steven P. Smith, Roscoe, IL (US); David J. Schaefers, Aurora, IL (US)

(73) Assignee: AT&T Intellectual Property I, LP, Reno, NV (US)

( * ) Notice: Subject to any disclaimer, the term of this patent is extended or adjusted under 35 U.S.C. 154(b) by 406 days.

(21) Appl. No.: 11/758,324

(22) Filed: Jun. 5, 2007

(65) Prior Publication Data
US 2008/0304412 A1 Dec. 11, 2008

(51) Int. Cl.
*G01R 31/08* (2006.01)
*G06F 11/00* (2006.01)
(52) U.S. Cl. .............. 370/242; 370/241.1; 370/245; 370/216; 370/252
(58) Field of Classification Search .......... 370/252
See application file for complete search history.

(56) References Cited

U.S. PATENT DOCUMENTS

| | | | |
|---|---|---|---|
| 5,920,846 A * | 7/1999 | Storch et al. ............... 705/7 |
| 6,147,975 A * | 11/2000 | Bowman-Amuah .......... 370/252 |
| 6,735,293 B2 * | 5/2004 | Doherty et al. .......... 379/201.12 |
| 2002/0123983 A1 * | 9/2002 | Riley et al. ................ 707/1 |
| 2006/0062211 A1 | 3/2006 | Manthoulis et al. |
| 2006/0072463 A1 | 4/2006 | Manthoulis et al. |
| 2006/0087979 A1 | 4/2006 | Schine et al. |
| 2006/0098578 A1 | 5/2006 | Mallya et al. |
| 2007/0036308 A1 | 2/2007 | Mallya et al. |
| 2007/0041329 A1 | 2/2007 | Schine |
| 2007/0112948 A1 * | 5/2007 | Uhlik ....................... 709/223 |
| 2008/0098400 A1 * | 4/2008 | Golitschek Edler Von Elbwart et al. ....................... 718/104 |
| 2008/0222532 A1 * | 9/2008 | Mester et al. ............... 715/738 |

* cited by examiner

*Primary Examiner* — Huy D Vu
*Assistant Examiner* — Omer Mian
(74) *Attorney, Agent, or Firm* — Larson Newman & Abel, LLP

(57) ABSTRACT

A system for managing one or more service level agreements associated with a switched metro Ethernet network is disclosed and manages one or more service level agreements associated with a switched metro Ethernet network. The system also includes a service level agreement (SLA) management reporting system (MRS) and a performance engine (PE) data filter coupled to the SLA-MRS. Further, the system includes one or more network elements connected to the PE data filter, wherein the SLA-MRS is configured to receive performance data from the PE data filter and at least partially based on the performance data validate one or more customer claims regarding an SLA violation.

29 Claims, 30 Drawing Sheets

US 7,940,677 B2

ARCHITECTURE FOR OPTICAL METRO ETHERNET SERVICE LEVEL AGREEMENT (SLA) MANAGEMENT

FIELD OF THE DISCLOSURE

The present disclosure relates generally to the monitoring of switched metro Ethernet networks.

BACKGROUND

Ethernet is a local-area network architecture that was developed in the late 1970s for use in offices, e.g., to interconnect computers to each other and to a common printer. In recent years, companies have begun to develop ways to expand Ethernet principles to wide area networks, e.g., using Internet routers that are interconnected in various ways. The result has been the creation of switched metro Ethernet data networks.

In an effort to market switched metro Ethernet services, service providers can offer varying levels of service for different prices. Moreover, a service can be considered a high level service and may be offered at a premium price if it has certain characteristics that are beneficial to customers. For example, a service provider may offer a service in which data is delivered at a relatively high packet delivery rate. Further, a service level agreement between a service provider and a customer may state that the data will be delivered at or above a particular packet delivery rate and the customer will pay a particular fee for that promised packet delivery rate. However, it can be difficult to provide an indication to a customer that the service they are receiving is meeting the level agreed to in the service level agreement.

Accordingly, there is a need for a system and method for managing one or more service level agreements in a switched metro Ethernet.

DETAILED DESCRIPTION OF THE DRAWINGS

In a preferred embodiment, a system manages one or more service level agreements associated with a switched metro Ethernet network. The system includes a service level agreement (SLA) management reporting system (MRS) and a performance engine (PE) data filter coupled to the SLA-MRS. Further, the system includes one or more network elements connected to the PE data filter, wherein the SLA-MRS is configured to receive performance data from the PE data filter and at least partially based on the performance data validate one or more customer claims regarding an SLA violation.

Figure 1:
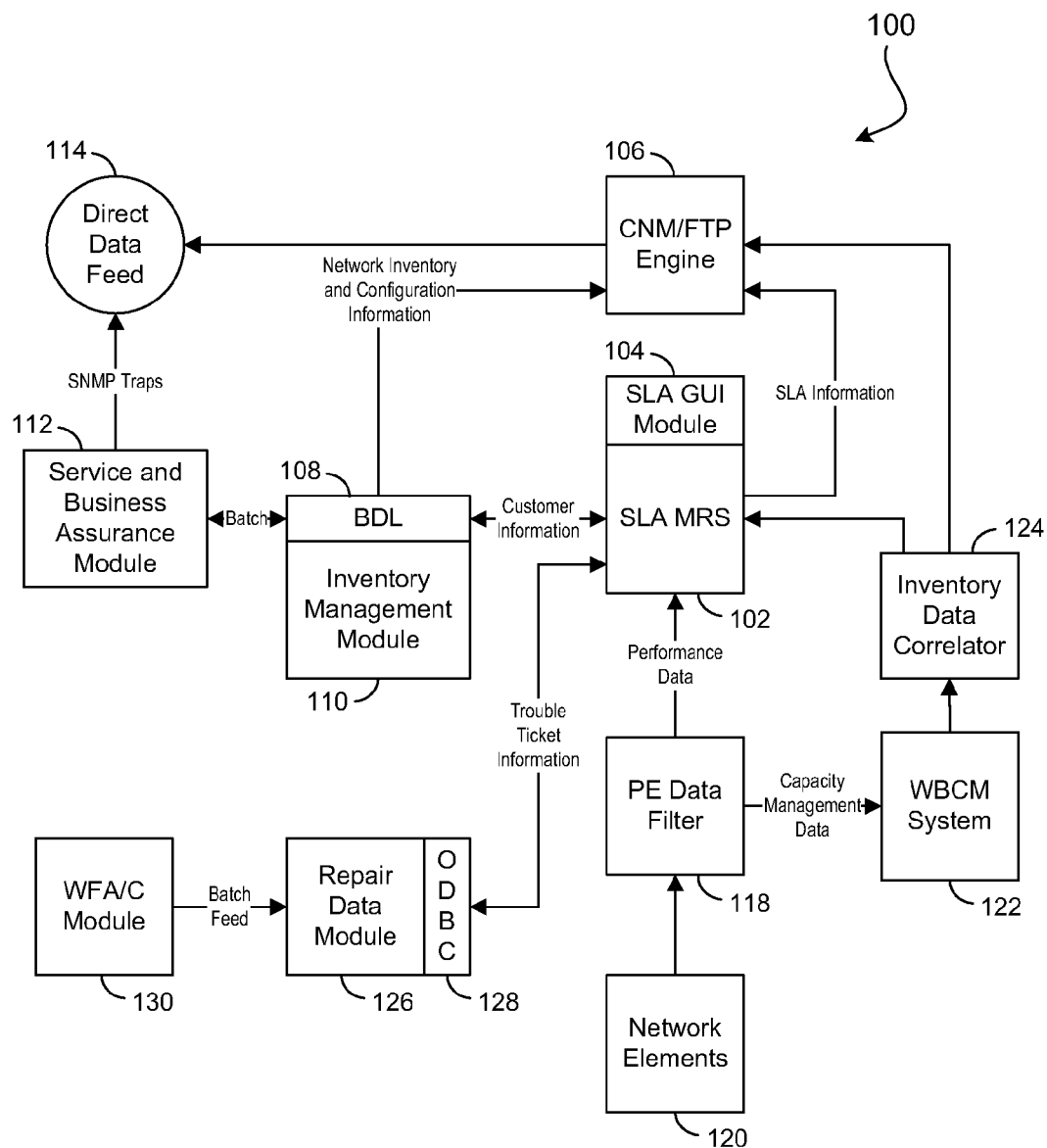
FIG. 1 is a block diagram of an embodiment of a system for managing one or more service level agreements in a switched metro Ethernet.

Referring initially to FIG. 1, a monitoring system associated with an optical Ethernet metropolitan area network (OPT-E-MAN) is shown and is generally designated 100. As shown, the system 100 can include a service level agreement (SLA) management reporting system (MRS) 102. In a particular embodiment, the SLA-MRS can be used to validate customer claims on OPT-E-MAN SLA violations. The SLA MRS 102 can include a SLA graphical user interface (GUI) module 104 which, in turn, can provide a GUI, described in detail below.

As illustrated in FIG. 1, the system 100 can include a customer network management/file transfer protocol (CNM/FTP) engine 106 connected to the SLA-MRS 102. The SLA-MRS 102 can provide SLA information to the CNM/FTP engine 106. The system 100 can also include a business delegate layer (BDL) 108 coupled to the SLA-MRS 102. The BDL 108 can include an inventory management module 110. The BDL 108 can exchange customer information with the SLA-MRS 102. Further, the BDL 108 can provide network inventory and configuration information to the CNM/FTP engine 106.

FIG. 1 further indicates that the system 100 can include a service and business assurance module 112 connected to the BDL 108. The service and business assurance module 112 can exchange batch information with the BDL 108. The system 100 can also include a direct data feed 114 connected to the service and business assurance module 112 and the CNM/FTP engine 106. In a particular embodiment, the direct data feed 114 can receive simple network management protocol (SNMP) traps from the service and business assurance module 112. The SNMP traps can include alarms associated with an OPT-E-MAN network As depicted in FIG. 1, the system 100 can also include a performance engine (PE) data filter 118 coupled to the SLA-MRS 102. One or more network elements 120 can be coupled to the PE data filter 118. The network elements 120 can include one or more network service engines (NSE), one or more PEs, one or more core devices, one or more edge devices, one or more additional network devices, or a combination thereof.

A web based capacity management (WBCM) system 122 can be coupled to the PE data filter 118. The PE data filter 118 can provide capacity management data to the WBCM system 122 and performance data to the SLA-MRS 102. FIG. 1 also indicates that an inventory data correlator 124 can be coupled to the WBCM system 122, the SLA-MRS 102, and the CNM/FTP engine 106.

Still referring to FIG. 1, the system 100 can include a repair data module 126 connected to the SLA-MRS 102. In a particular embodiment, the repair data module 126 can be connected to the SLA-MRS 102 via open database connectivity (ODBC) 128. Alternatively, the repair data module 126 can be connected to the SLA-MRS 102 via java database connectivity (JDBC). The repair data module 126 can exchange trouble ticket information with the SLA-MRS 102. FIG. 1 also shows that the system can include a work force administration control (WFA/C) module 130.

Figure 2:
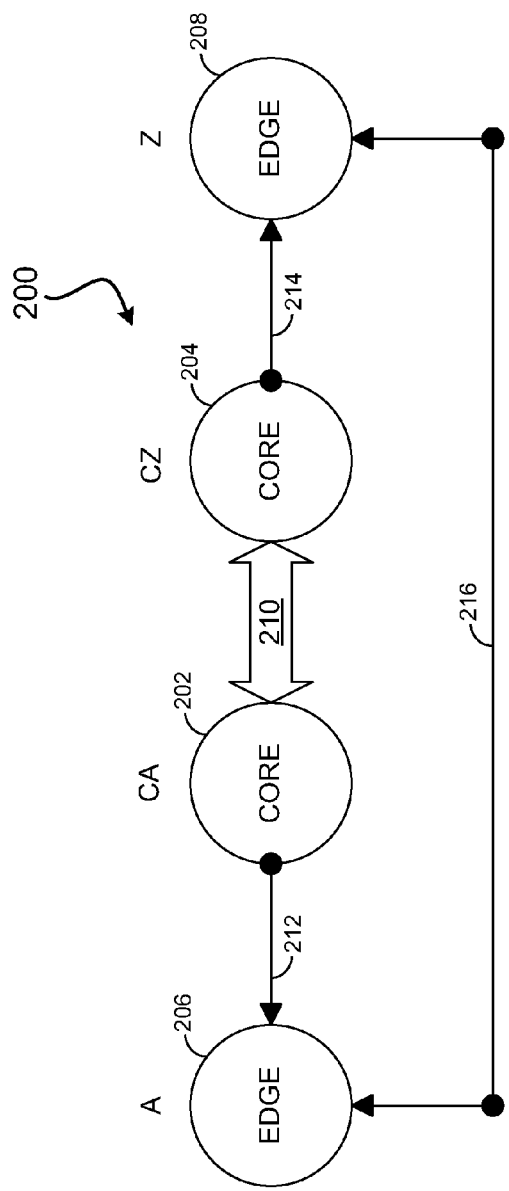
FIG. 2 is a block diagram of a first embodiment of a switched metro Ethernet.
Figure 3:
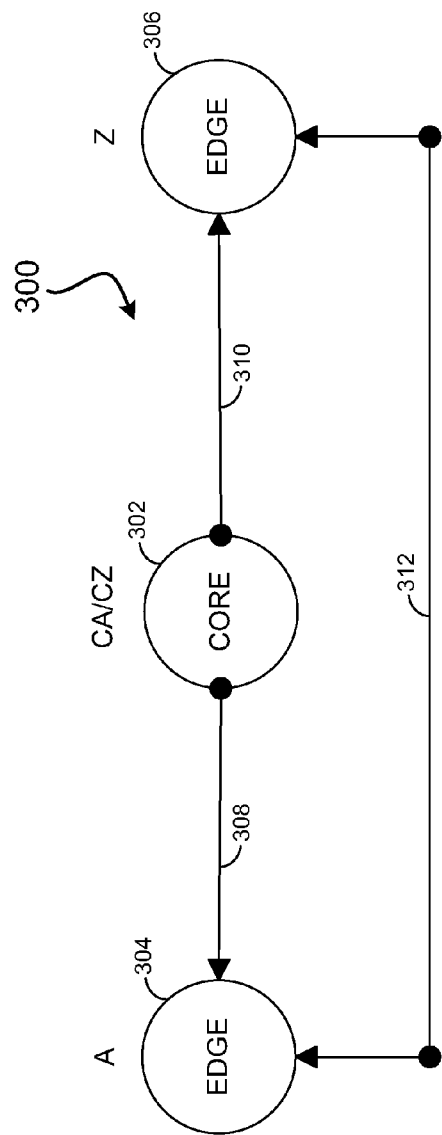
FIG. 3 is a block diagram of a second embodiment of a switched metro Ethernet.

In a particular embodiment, the system 100 describe herein can be used to monitor and manage an OPT-E-MAN network. FIG. 2 through FIG. 3 illustrate exemplary OPT-E-MAN network configurations. The SLR MRS 102 can collect, calculate, and display customer and port level network availability information. Network availability data can be based on close trouble reports from the WFA/C module 130 received via the repair data module 126. The SLA MRS 102 can support multi-tenant conditions in which multiple customers share an edge device or a core device. The SLA GUI 104 provided by the SLA MRS 102 can allow a technician at an enhanced network operations center (ENOC) to access the system 100 in order to validate and verify customer claims regarding OPT-E-MAN SLA violations.

One or more NSEs can provide combined performance and capacity raw data using one or more PE collectors, e.g., probes. The performance data can be provided to the SLA-MRS 102 and the SLR-MRS 102 can collect the data, normalize and correlate the data, and further correlate the performance data with customer data. The inventory management module 110 can provide customer information and circuit information for data correlation. The repair data module 126 can provide trouble ticket information, e.g., resolved trouble ticket information, open trouble ticket information, number of trouble tickets, frequency of trouble tickets, etc.

In a particular embodiment, SLA service assurance agent (SAA) data can be collected for metro nodes. Probes can send a predetermined number of test packets per a predetermined time interval, e.g., five minutes. Each test packet can travel round-trip. A packet can travel from an initiating node (A) to a responding node (Z) and then, the packet can return to the initiating node (A) to report the result of the test packet to a management information base (MIB) within the initiating node (A). A data collector within a PE can periodically poll the MIB within each initiating node (A) to retrieve the content of the MIB and report the information to the SLA MRS 102 via the PE data filter 118.

Probe data can be directionally independent. In other words, the data reported for a particular initiating node (A) to a particular responding node (Z) is applicable from the responding node (Z) to the initiating node (A). Probes can be configured differently for core-to-core testing, core-to-edge testing, and edge-to-edge testing. Moreover, probes can be configured differently for different classes of service, e.g., bronze, silver, and gold. Each probe can report a complete set of information, e.g., packet delivery rate (PDR), latency, and jitter. PDR is a measure of what percentage of packets that were offered to a network actually reach the packet destination. Latency is a measure of the delay that one or more packets experience as the travel through a network. Latency can include time spent in buffers and propagation delay. Jitter is a measure of the variance in inter-packet arrival rate at a particular destination.

In a particular embodiment, a technician at the ENOC can validate a customer claim of network availability SLA violations after the customer has notified the ENOC of the network outage and a trouble ticket has been opened in response to the reported outage. A closed ticket can be eligible for scrubbing for a predetermined number of days, e.g., three business days, after the end of the calendar month in which it was closed. A trouble report can be also be scrubbed for a predetermined number of days, e.g., three business days, past the calendar month in which the trouble report was closed. In order to determine whether a trouble ticket has been scrubbed or not, the date the ticket was last updated can be checked each night.

The SLA-MRS 102 can distinguish between a retail customer and a wholesale customer at the SLA level. For a particular Ethernet virtual connection (EVC) path, a point-of-presence (POP) can be a retail customer if the POP is the originating customer. In other cases, the POP would be a wholesale customer. A POP can be a valid originating customer and a valid wholesale customer. The SLA-MRS can search by POP location and produce SLA information for all customers connected to that POP. In other words, the user can search for all POP EVC paths/SLA performance metric or ports/network availability even if the POP is not the originating customer. Additionally, the SLA-MRS 102 can map a POP to another POP with regard to a SLA. In other words, it can be valid for both the A side and Z side customers for an EVC Path to be a POP. In such a case, one of the POPs can be the originating customer.

In a particular embodiment, the SLA-MRS 102 can accept inventory data files in support of point-to-point and Multi-tenant capability. Further, the SLA-MRS 102 can support conditions where multiple devices reside at the same building site. For example, if two or more routers are located in at the same site address.

Class of service can be associated with a port order/UNI port. The class of service of the point-to-point EVC circuit can be the lowest common denominator of the port order classes of service associated with it. The SLA-MRS 102 can support a multi-tenant-to-multi-tenant configuration. The SLA-MRS 102 can also support single tenant to single tenant configuration. Moreover, the SLA-MRS 102 can support multi-tenant to single tenant configuration and conversely single tenant to multi-tenant.

The SLA-MRS 102 can distinguish customer connections one from another even in cases when there are multiple customer records mapping to a single IP address. For example, this can occur for cases where one side of the connection is a common UNI port or Special Customer/POP, i.e., a multi-tenant sub-case. The SLA-MRS 102 can also distinguish customer connections one from another when there are multiple customer records mapping to a single IP address. For example, this can happen in cases where both sides of the connection are a common UNI port or Special Customer/POP, i.e., the multi-tenant sub-case.

In a particular embodiment, the SLA-MRS 102 can calculate and display customer and port level network availability information. Network availability can be calculated as described below. The amount of time that the OPT-E-MAN network is available to service customer data can be divided by the amount of time in the measurement period. Outage time (Rebate Duration) of closed, customer-initiated trouble reports, according to WFA/C, counts against uptime as defined herein. WFA trouble tickets opened by the ENOC in response to customer-reported network outages can be subtracted from the uptime amount before dividing by the time interval. These trouble tickets must be closed tickets only, and must be generated by an authorized WFA/C repair center.

The SLA-MRS 102 can calculate network availability using the formula shown in Table 1, below. A particular data element is the Rebate Duration (r). Rebate Duration can be defined as the 'outage' time during the period being considered. In the example shown in Table 1, a customer having "p" ports had outages totaling "m" minutes.

TABLE 1

Network Availability Calculation.

| Rebate Duration (Outage Time) | Total Time in Calculation Period | Percent Network Availability |
|---|---|---|
| r minutes | t minutes | $\left(\dfrac{t*p - \Sigma m}{t*p}\right) \times 100 =$ Network Availability % |

TABLE 1-continued

Network Availability Calculation.

| Rebate Duration (Outage Time) | Total Time in Calculation Period | Percent Network Availability |
|---|---|---|
| 425 minutes | (30 days) × (24 hours) × (60 minutes) = 43200 minutes | $\left(\frac{43200 * 10 - 425}{43200 * 10}\right) \times 100 = 99.90\%$ |

Monthly network availability for a customer port can be calculated using the formula t=r×1440, where t is the number of days in the month times twenty-four (24) hours times sixty (60) minutes and r is the time value shown in a WFA/C screen OSSTR, Field Rebate Duration for the trouble report. If scrubbing by WFA is required, then the final 'Rebate Duration' will be available only after the closed trouble report has been scrubbed. If scrubbing is not required, then the 'Rebate Duration' will be available after the trouble report has been closed. Calculations can include ports that have been active for the entire month. Any port that is not active for the entire month can be ignored.

For example, assume customer A has 5 ports at the beginning of August 2005 (Port1, Port2, Port3, Port4, and Port5). During the month of August, the customer moved two branches from one metro area to another. This resulted in deactivating Port3 and Port4 and activating new ports in the new locations (Port6 and Port7). For simplicity, assume that both the activation and deactivation happened on the 20th of August. This customer happened to have some outages during August as follows:

Port2 went down on the 11th for 4 hours.
Port4 went down on the 29th for 2 hours.
Port3 went down on the 15th for 2 days (before the port was deactivated).
Port6 went down on the 25th for 2 days (after being activated on the 20th).

Based on the above information, the following represent rebate durations received from the repair data module 130:

240 minutes on the 11th for Port2.
120 minutes on the 29th for Port4.
2880 minutes on the 15th and the 16th for Port3.
2880 minutes on the 25th and the 26th for Port 6.

In a particular embodiment, the SLR-MRS 102 can extract scrubbed trouble tickets. The scrubbed trouble tickets can be automatically sent to the repair data module 126 and extracted from the repair data module 126. When a trouble ticket is scrubbed, the SLR-MRS 102 can reapply the outage to the date on which the customer reports the problem. This information can be reported to the SLA-MRS 102 in a nightly feed by the repair data module 126. The SLA-MRS 102 can also tag circuit inventory data, pertaining to multipoint customer configuration, for correlation with downstream applications.

In a particular embodiment, the SLR-MRS 102 can present a monitoring view of trouble tickets as a graph via the SLA GUI 104. The abscissa can represent time and the ordinate can represent the number of trouble tickets closed. Time can be given per day, month-to-date, per month, by Port circuit ID, etc. The SLR-MRS 102 can also present a monitoring view of rebate duration as a line graph via the SLA GUI 104. The abscissa can represent time and the ordinate can represent sum of individual rebate durations for all closed trouble tickets by customer for a particular time period.

The SLA-MRS 102 can accept the data shown in Table 2 from the repair data module 126. This data can be delivery via a direct ODBC/JDBC database call from the SLA-MRS 102 during a daily time frame.

TABLE 2

Data accepted from the Repair Data Module.

| Field Name | WFA Field | ASKME Field | Field Description |
|---|---|---|---|
| Ticket Number | TR # | Report Num | WFA Trouble report number used in conjunction with the WFA center ID (CTR) to uniquely track and identify trouble reports in WFA/C |
| Center | CTR | Center | WFA/C repair cente from which the trouble report originated. |
| Received Date | RECD | Receive Date | Date that the trouble ticket was created in WFA/C. |
| Received Time | RECD | Receive Time | Time that the trouble ticket was created in WFA/C. |
| Closed Date | STAT CLD | Closed Date | Date that the trouble ticket was closed in WFA/C. |
| Closed Time | STAT CLD | Closed Time | Time that the trouble ticket was closed in WFA/C. |
| Restored Date | REST_DATE | Restore Date | Date that service was restored. |
| Restored Time | REST_DATE | Restore Time | Time that service was restored. |
| Last Update Date | LAST_UPD_DT | Last Upd Date | The date of the latest update (scrub) of the trouble report. |
| Last Update Time | LAST_UPD_DT | Last Upd Time | The time of the latest update (scrub) of the trouble report. |
| Circuit ID | CKT | CKTID | WFA/C circuit identifier |
| Rebate Duration | REB DUR | Rebate Duration | The duration for which the customer is entitled a rebate. |
| No Access | | (2 fields) No Access SVC No Access other | Timer representing the total time that the customer and/or customer premise could not be accessed by SBC. |
| Report Category | RPTCAT | Report Category | Trouble report category - i.e., Customer Reported (CR) |

TABLE 2-continued

Data accepted from the Repair Data Module.

| Field Name | WFA Field | ASKME Field | Field Description |
|---|---|---|---|
| Trouble Code | TRBL CD | TRBL CD | Identifies where in the network the trouble was found. |
| Analysis Code | AN CD | Analysis Code | identifies the cause of the trouble. |

The SLA-MRS 102 can include the data fields shown in Table 3 in order to correlate data from the inventory management module 110 to probe data.

TABLE 3

Data used to correlate data from the inventory management module to probe data.

| GRANITE INFORMATION | FIELD DESCRIPTON |
|---|---|
| ID | EVC Circuit Identifier |
| A Side Port Order Ckt | A Side order circuit in EVC circuit sequence |
| Z Side Port Order Ckt | Z Side order circuit in EVC circuit sequence |
| A Side CLLI | A Side Order DEVICE CLLI |
| A Side UNI | A Side Order DEVICE UNI PORT |
| A Side CIR | A Side Order DEVICE UNI PORT CIR |
| A Side CoS | A Side Order DEVICE UNI PORT CoS |
| A Side Site | A Side Order SITE CLLI |
| Z Side CLLI | Z Side Order DEVICE CLLI |
| Z Side UNI | Z Side Order DEVICE UNI PORT |
| Z Side CIR | Z Side Order DEVICE UNI PORT CIR |
| Z Side CoS | Z Side Order DEVICE UNI PORT CoS |
| Z Side Site | Z Side Order SITE CLLI |
| Category | EVC Category |
| Customer EVC PT-to-Pt Ckt? | Is this an EVC Circuit?-DERIVED |
| CSME? | Is this a CSME Circuit?-DERIVED |
| Ordering Customer | EVC Ordering Customer Name |
| A Side Customer | EVC A Side Customer Name |
| Z Side Customer | EVC Z Side Customer Name |
| CoS | EVC Class Of Service-DERIVED |
| Bandwidth | EVC Circuit CIR |
| A Side Street Address | EVC Circuit A Side Site Street Address |
| Z Side Street Address | EVC Circuit Z Side Site Street Address |
| A Side Port City | EVC Circuit A Side Site City |
| A Side Port State | EVC Circuit A Site State |
| A Side Port Zip Code | EVC Circuit A Side Site Zip Code |
| A Side Port LATA | EVC Circuit A Side Site LATA |
| Z Side Port City | EVC Circuit Z Side Site City |
| Z Side Port State | EVC Circuit Z Side Site State |
| Z Side Port Zip Code | EVC Circuit Z Side Site Zip Code |
| Z Side Port LATA | EVC Circuit Z Side Site LATA |

The SLA-MRS 102 can include the data fields shown in Table 4 in order to correlate data from the inventory management module 110 to probe data. This data can be received from one or more PEs.

TABLE 4

Data received from a PE to correlate data from the inventory management module to probe data.

| FIELD NAME | FIELD DESCRIPTON |
|---|---|
| IP | Device IP Address |
| CLLI | Device CLLI |

In a particular embodiment, the SLR-MRS 102 can produce a daily report, e.g., a Trouble Activity Report, which can contain a list of closed trouble tickets generated in response to customer claims of SLA violation. The SLR-MRS 102 can also produce a daily trouble ticket report that includes all trouble tickets closed or modified for that day. The SLR-MRS 102 can aggregate data from one or more PEs to calculate month-to-date reports. The SLR-MRS 102 can also aggregate data from monthly reports to calculate year-to-date reports. Plotting and reporting for PDR, latency, and jitter can be given based on time, e.g., month, month-to-date, year-to-date, etc.; customer; class of service; VPLS circuit ID; EVC circuit ID; location metro area; switch (device) CLLI; or a combination thereof. The SLA-MRS 102 can produce an All Connection Monthly Report having the content listed in Table 5.

TABLE 5

Format for an All Connection Monthly Report.

| Report Field | Report Description | Sample data |
|---|---|---|
| Date: | Month in format YYYY-MM | 2005-05 |
| Type: | Metro (OPT-E-MAN) and CSME (Only Metro for phase 2) | METRO |
| CustomerO | Ordering Customer Name | 2WIRE |
| MPT VPLS or PT to PT EVC Circuit: | Customer "Point to Point" EVC or "Multi-Point" VPLS Path Name | 86/KQGN/567010 |
| CIRCUIT TYPE: | Valid Types: MULTI-PT* PT-TO-PT | PT-TO-PT |
| CIRCUIT CATEGORY: | Valid Types: VPLS* EVC-VLAN ONLY MPLS ROUTE-ERS MPLS ROUTE-ERS & EWS MPLS ROUTE-EWS MPLS ROUTE | MPLS ROUTE-ERS & EWS |
| EVC CoS | Valid Types: SILVER BRONZE | BRONZE |
| EVC Circuit Bandwidth: | EVC Path Bandwidth | 20 MBPS |
| CustomerA | Customer on A Side | 2WIRE |
| IpA | IP Address of Edge Switch on A Side | 10.76.2.140 |
| EdgeA | Switch CLLI code on A Side | SNJTCAWX0AW |
| SiteA | Site CLLI code on A Side | SNJTCAWXH00 |
| UniA | Uni Port on A Side | FA0/01 |
| CirA | Cir on A Side | 100 MBPS |
| CoreA | CLLI code of Cisco 7609 homed to Cisco 3550 on A Side of Path (RESCINDED) or same as Edge if Direct Connect | SNJSCA0225W |
| AddressA | Street Address of SiteA | 1704 AUTOMATION PARKWAY |
| CustomerZ | Customer on Z Side | SBCIS INTERNET SERVICES |
| IpZ | IP Address of Edge Switch on Z Side | 10.76.4.2 |
| EdgeZ | Switch CLLI code on Z Side | PLTNCA60H02 |
| SiteZ | Site CLLI code on Z Side | PLTNCA60H02 |
| UniZ | Uni Port on Z Side | GI0/02 |
| CirZ | Cir on Z Side | 1 GB |
| CoreZ | CLLI code of Cisco 7609 homed to Cisco 3550 on Z | PLTNCA1301W |

TABLE 5-continued

Format for an All Connection Monthly Report.

| Report Field | Report Description | Sample data |
|---|---|---|
| | Side of Path (RESCINDED) or same as Edge if Direct Connect | |
| AddressZ | Street Address of SiteZ | 6621 OWENS DRIVE |
| MeasRdng | Measured readings for Month | 2973 |
| EC-A PDR | A Side EC PDR | 100.00 |
| EC-Z PDR | Z Side EC PDR | 100.00 |
| CC PDR | CC PDR or 100% if Hairpin | 100.00 |
| Ave PDR: | Average Overall PDR for the month (SLA is based on this) | 100.00 |
| Minimum PDR: | Minimum 15-minute PDR measured during the month | 100.00 |
| ECntPDR: | Number of 15-minute intervals where the PDR SLA was exceeded | 0 |
| EPctPDR: | Percent of 15-minute readings that exceed the PDR SLA (based on total count of 15-minute readings) | 0.00% |
| AvgLATENCY | Average Latency for the month | 2.14 |
| MaxLATENCY | Maximum Latency measured during the month | 5 |
| ECntLATENCY | Number of 15-minute AVG intervals where the Latency SLA was exceeded | 0 |
| EPctLATENCY | Percent of 15-minute AVG readings that exceed the Latency SLA (based on total count of 15-minute readings) | 0.00% |
| AvgJITTER | Average Jitter (SILVER only) | 0.91 or '-' |
| MaxJITTER: | Maximum Jitter measured during the month (SILVER only) | 3 or '-' |
| ECntJITTER: | Number of 15-minute MAX intervals where the Jitter SLA was exceeded (SILVER only) | 0 or '-' |
| EPctJITTER | Percent of 15-minute MAX readings that exceed the Jitter SLA (based on total count of 15-minute readings) (SILVER only) | 0.00% or '-' |

The SLA-MRS 102 can produce an on-demand monthly report that can correlate a current snapshot of inventory information to uncorrelated probe information. The SLA-MRS 102 can also produce a monthly performance report, e.g., in a CSV format, which can be re-run after the system 100 repairs inventory data found to be in error after the fact. The SLA-MRS 102 can produce an SLA report on network availability results from the previous month during a current month. Further, the SLA-MRS 102 can produce month-to-date Network Availability results from the current month, on demand. The SLA-MRS 102 can also provide a daily report of all trouble tickets received from the repair data module 126, indicating any trouble tickets which cannot be correlated to inventory data. Additionally, the SLA-MRS 102 can provide reports of network availability as a tabular view listing availability by percentage and downtime in minutes. These reports can include the following information: customer information, e.g., physical address and CLLI code; port circuit ID; WFA trouble tickets associated with the circuit; and rebate duration, i.e., total time circuit was unavailable after validation or scrubbing was performed. Further, these reports can be expressed in both minutes of downtime and percentage availability. Outage can be presented in three increments, e.g., daily (customer, port circuit ID and trouble ticket number), monthly (Customer, Port Circuit ID), and monthly (Network availability by metro customer). The reports can be expressed on two separate screens, e.g., one screen for minutes of downtime and one screen for percentage availability. The SLA-MRS 102 can also provide a CSV report daily via FTP that includes the information in the Table 3 and Table 4.

Referring to FIG. 2, a first embodiment of a network system is shown and is designated 200. As shown, the network system 200 can include a first core switch 202 connected to a second core switch 204. A first edge switch 206 can be connected to the first core switch 202. Further, a second edge switch 208 can be connected to the second core switch 204. The second edge switch 208 can also be connected to the first edge switch 206.

In a particular embodiment, as shown in FIG. 2, the network system 200 can include a bidirectional segment probe 210 that can originate at the first core switch 202, the second core switch 204, or a combination thereof. The bidirectional segment probe 210 can measure a packet delivery rate (PDR) from the first core switch 202 to the second core switch 204 and from the second core switch 204 to the first core switch 202.

As illustrated in FIG. 2, the network system 200 can include a first unidirectional segment probe 212 between the first core switch 202 and the first edge switch 206. The first unidirectional segment probe 212 can originate at the first core switch 202. The first unidirectional segment probe 212 can measure the PDR from the first core switch 202 to the first edge switch 206.

The network system 200 can also include a second unidirectional segment probe 214 between the second core switch 204 and the second edge switch 208. The second unidirectional segment probe 214 can originate at the second core switch 204. The second unidirectional segment probe 214 can measure the PDR from the second core switch 204 to the second edge switch 208.

FIG. 2 shows that the network system 200 can also include an end-to-end probe 216 between the first edge switch 206 and the second edge switch 208. In a particular embodiment, the end-to-end probe 216 can be a bidirectional probe. Additionally, the end-to-end probe 216 can be used to measure latency and jitter through the entire system, e.g., from the first edge switch 206 to the second edge switch 208 through the core switches 202, 204 and from the second edge switch 208 to the first edge switch 206 through the core switches 202, 204.

FIG. 3 depicts a second embodiment of a network system, designated 300. As indicated in FIG. 3, the network system 300 can include a core switch 302. A first edge switch 304 can be connected to the core switch 302. Further, a second edge switch 306 can be connected to the core switch 302.

The network system 300 can include a first unidirectional segment probe 308 between the core switch 302 and the first edge switch 304. The first unidirectional segment probe 308 can originate at the core switch 302. The first unidirectional segment probe 308 can measure the PDR from the core switch 302 to the first edge switch 304.

The network system 300 can also include a second unidirectional segment probe 310 between the core switch 302 and the second edge switch 306. The second unidirectional segment probe 310 can originate at the core switch 302. The second unidirectional segment probe 310 can measure the PDR from the core switch 302 to the second edge switch 306.

As shown in FIG. 3, the network system 300 can also include an end-to-end probe 312 between the first edge switch 304 and the second edge switch 306. In a particular embodiment, the end-to-end probe 312 can be a bidirectional probe. Additionally, the end-to-end probe 312 can be used to measure latency and jitter through the entire system, e.g., from the first edge switch 304 to the second edge switch 306 through the core switch 302 and from the second edge switch 306 to the first edge switch 304 through the core switch 302.

Figure 4:
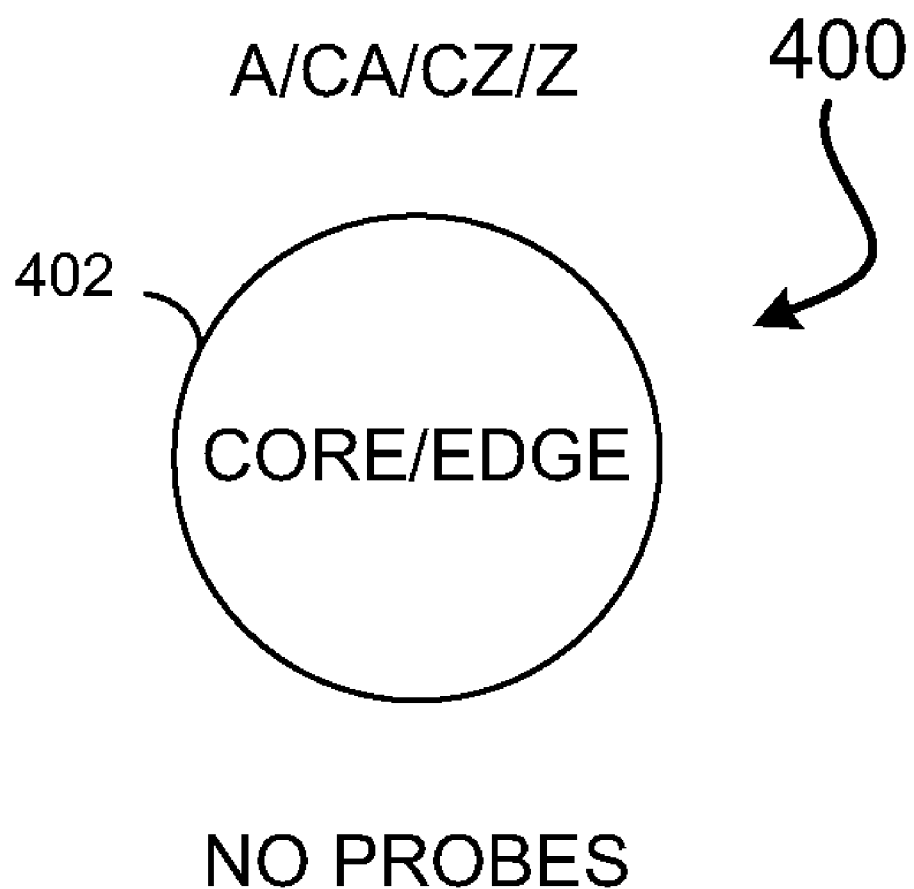
FIG. 4 is a block diagram of a third embodiment of a switched metro Ethernet.

FIG. 4 illustrates a third network system 400. As shown, the third network system 400 can include a combined core/edge switch 402. The third network system 400 does not include any probes.

Figure 5:
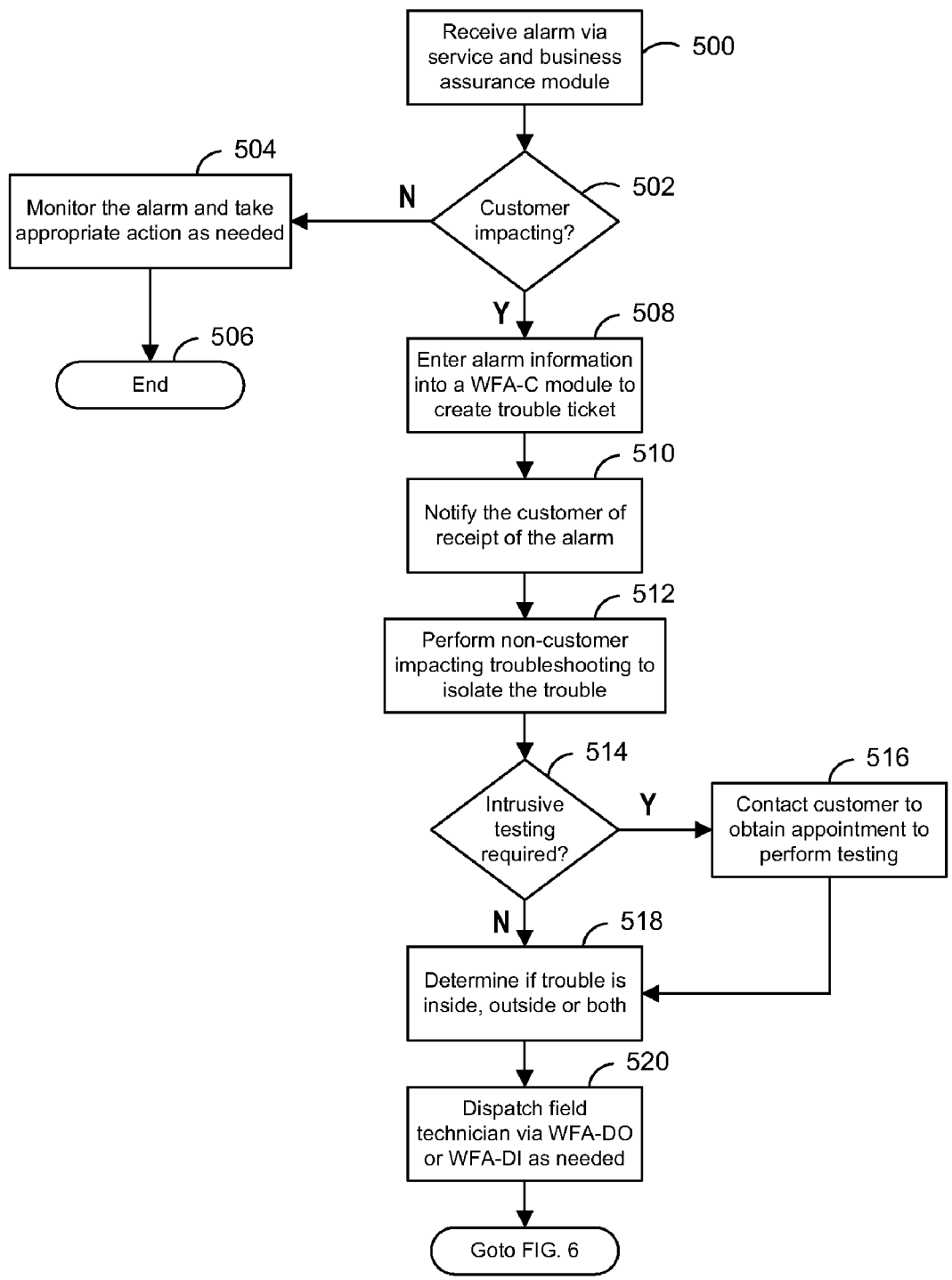
FIG. 5 through FIG. 7 illustrate a flow chart of an embodiment of a method of maintaining and repairing a switched metro Ethernet.
Figure 6:
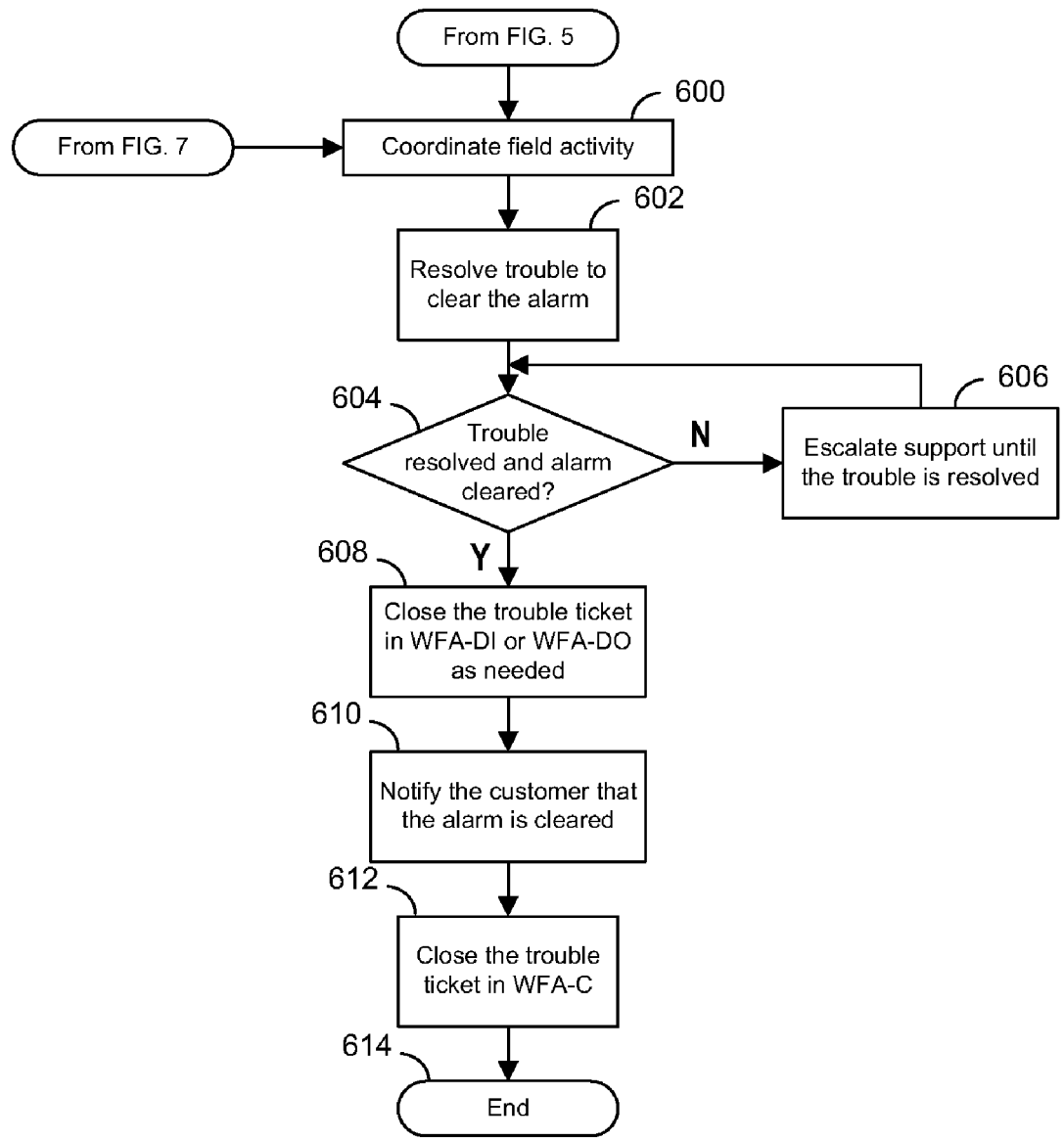
Figure 7:
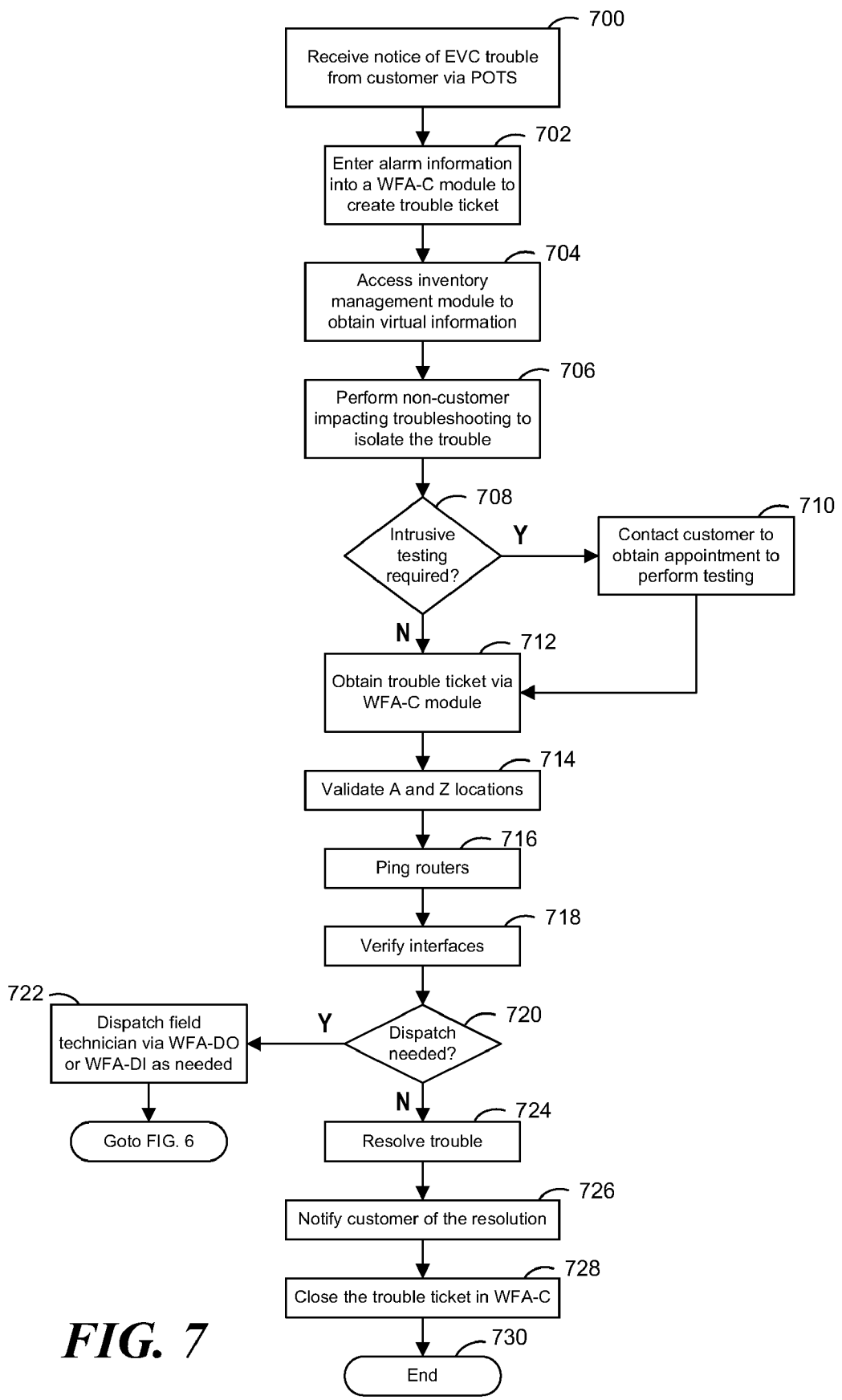

Referring to FIG. 5 through FIG. 7, a method of maintaining and repairing a network is shown and commences at block 500. At block 500, an alarm is received via a service and business assurance module. At decision step 502, it is determined whether the alarm is customer impacting. If not, the method proceeds to block 504 and the alarm is monitored and appropriate action can be taken as needed. The method can then end at state 506.

Returning to decision step 502, if the alarm is customer impacting, the method can proceed to bock 508 and the alarm can be entered into a WFA-C module to create a trouble ticket. At block 510, the customer can be notified of the receipt of the alarm. Thereafter, at block 512, non-customer impacting troubleshooting can be performed in order to isolate the trouble.

Proceeding to decision step 514, it can be determined whether intrusive testing is required. If so, the method can move to 516 and the customer can be contacted in order to obtain an appointment to perform testing. Thereafter, the method moves to block 518. Returning to decision step 514, if intrusive testing is not required, the method also moves to block 518. At block 518, it is determined if the trouble is inside the customer location, outside the customer location, or both. The method can then move to block 520 and a field technician can be dispatched via WFA dispatch outside (DO) or WFA dispatch inside (DI) as needed. Thereafter, the method moves to block 600 of FIG. 6.

At block 600, field activity can be coordinated. Then, at bock 602 an attempt can be made in order to resolve the trouble and clear the alarm. Moving to decision step 604, it can be determined whether the trouble is resolved and the alarm cleared. If not, the method moves to block 606 and support can be escalated until the trouble is resolved. Thereafter, the method returns to decision step 604.

At decision step 604, if the trouble is resolved and the alarm is cleared, the method can continue to block 608 and the trouble ticket can be closed in WFA-DI or WFA-DO, as needed. The method can then move to block 610 and the customer is notified that the alarm is cleared. At block 612, the trouble ticket is closed in WFA-C. The method can then end at state 614.

FIG. 7 illustrates a portion of the method used when a customer reports trouble via a telephone report. At block 700, notice of EVC trouble is received from a customer via the plain old telephone system (POTS). At block 702, alarm information can be entered into a WFA-C module to create a trouble ticket. Thereafter, at block 704, an inventory management module can be accessed in order to obtain virtual information associated with the customer. This information can include the customer IP address and additional circuit information.

Moving to block 706, non-customer troubleshooting can be performed in order to isolate the trouble. At decision step 708, it can be determined whether intrusive testing is required. If so, the method moves to block 710 and the customer can be contacted to obtain an appointment to perform testing. The method can then proceed to block 712. Returning to decision step 708, if intrusive testing is not required, the method also moves to block 712. At block 712, a trouble ticket can be obtained via a WFA-C module. Then, at block 714, A and Z locations can be validated. At block 716, the routers associated with the A and Z locations can be pinged. Further, at block 7189, the interfaces associated with these locations can be verified.

Continuing to decision step 720, it can be determined whether dispatch is needed. If so, the method can proceed to block 722 and a field technician can be dispatched via WFA-DO or WFA-DI, as needed. The method can then proceed to block 600 of FIG. 6 and continue as described herein.

Returning to decision step 720, if dispatch is not needed, the method can move to block 724. At block 724, the trouble can be resolved. Then, at block 726, the customer can be notified of the resolution. At block 728, the trouble ticket can be closed in WFA-C. The method can then end at state 730.

Figure 8:
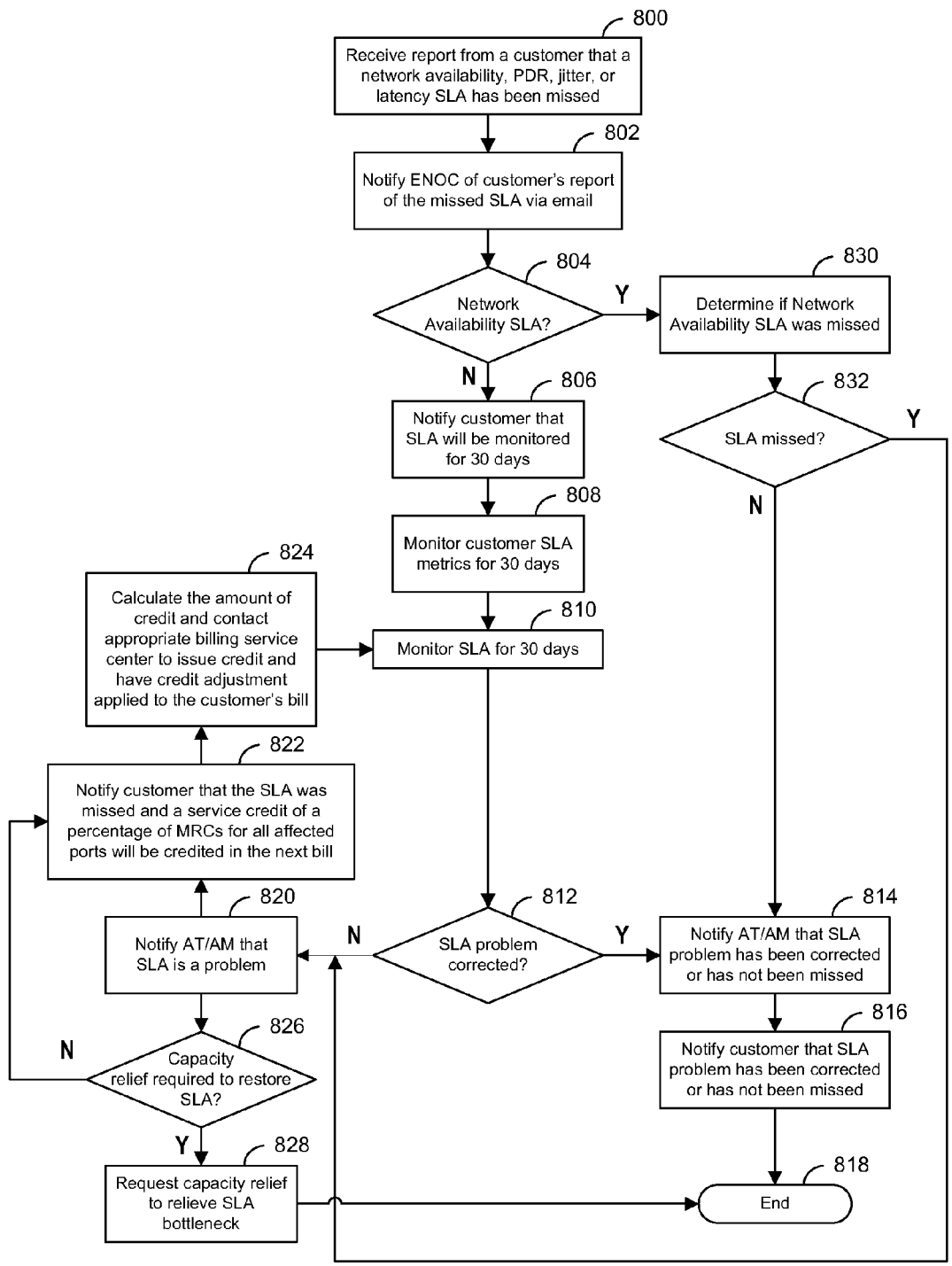
FIG. 8 illustrates a flow chart of an embodiment of a method of managing one or more service level agreements within a switched metro Ethernet.

Referring now to FIG. 8, a method of determining SLA credits is shown and commences at block 800. At block 800, a report is received from a customer that a network availability, PDR, jitter, or latency SLA has been missed. In a particular embodiment, the report is received at an account manager (AM) or an account team (AT). At block 802, ENOC is notified of the customer's report of the missed SLA via email. The AT/AM can send customer information, e.g., customer name, circuit ID, missed SLA, estimated time frame of miss, etc., to the ENOC.

Moving to decision step 804, it is determined whether the missed SLA is a network availability SLA. If not, the method proceeds to block 806 and the customer is notified that the SLA will be monitored for thirty (30) days. Thereafter, at block 808, one or more SLA metrics are monitored for thirty (30) days. Further, at block 810, the SLA is monitored for thirty (30) days.

Proceeding to decision step 812, it is determined whether the SLA problem is corrected. If so, the method moves to block 814 and the AT/AM is notified that the SLA problem has been corrected or that the SLA was not missed. The ENOC can provide customer reports that validate that the SLA has been corrected or that the SLA was not missed. Thereafter, at block 816, the customer is notified by the AT/AM that the SLA problem has been corrected or has not been missed. The method can then end at state 818.

Returning to decision step 812, if the SLA problem is not corrected, the method proceeds to block 820 and the AT/AM is notified that the SLA is a problem. The method can then move to block 822 and the customer can be notified that the SLA was missed and a service credit of a percentage of MRCs for all affected ports will be credited in the next bill. Then, at block 824, the amount of the credit is calculated and the appropriate billing center is contacted to issue the credit and have the credit adjustment applied to the customer's next bill. The method then returns to block 810 and continues as described herein.

From block 820, the method can also proceed to decision step 826 and ENOC determines whether capacity relief is required to restore the SLA. If so, the method moves to block 828 and the ENOC can request capacity relief to relieve the SLA bottleneck. The method can then end at state 818.

Returning decision step 804, if the missed SLA is a network availability SLA, the method moves to block 830. At block 830, the ENOC determines if the network availability SLA was missed based on the reports generated by an SLR-MRS. Then, at block 832, it is determined whether the SLA was missed. If so, the method can move to block 820 and continue as described herein. If not, the method can proceed to block 814 and continue as described herein.

Referring now to FIG. 9 through FIG. 30 an embodiment of a SLA GUI is shown. In a particular embodiment, the SLA GUI can be accessed via a computer, e.g., by a technician at the ENOC. The SLA GUI is part of a SLA MRS application that can be used to test and verify the northbound interfaces (NBI) of an element management system (EMS), e.g., the system described above. The SLA MRS application contains the logic to access and execute a particular EMS NBI. Further, the SLA MRS application has the ability to integrate one or more stand-alone EMSs. This integration can be as simple as incorporating an EMS into the overall graphical user interface of the software to the more complex integration of an individual EMS with other software supported EMSs. In a particular embodiment, the SLA MRS application can support one or more tasks of the ENOC as they relate to the maintenance and provisioning of an OPT-E-MAN.

In a particular embodiment, as described above, the system can include group of independent systems which rely heavily on eXtensible Markup Languages (XML) for both a northbound application program interface (API) and GUI. OPT-E-MAN can rely on one or more PEs to collect performance data to be used for SLA and CNM applications. The PE software can be a UNIX based application, which collects, processes, and stores performance data temporarily from various collection points. The PEs can utilize a service assurance agent (SAA) to measure end-to-end performance. A PE SAA collector can collect performance data measured by the SAA within an IOS device. The collectors can provide different types of measurements by simulating different types of protocols. SAA can be used to measure performance statistics between two (2) routers. OPT-E-MAN can use these SAA collectors to provide PDR, latency, and jitter statistics. A PE can also send normalized and formatted data to upper layer performance management applications.

OPT-E-MAN can deploy ISC for provisioning services. In addition to a GUI interface, shown in FIG. 9 through FIG. 30, the ISC API provides operations support systems the capability to insert, retrieve, update, and remove data from ISC servers using an eXtensible Markup Languages (XML) interface request/response system. The API requests are executed using a combination of HTTP/HTTPS and Simple Object Access Protocol (SOAP). The ISC server processes the XML requests and returns an XML response, which is also an encoded SOAP message, to indicate if the request is successful, or to return data.

The SLA MRS application includes an SLA GUI, shown in FIG. 9 through FIG. 30, that can provide a user friendly way of executing 'canned' SOAP/XML scripts. Using NBI testing logic, the SLA MRS application is able to integrate separate EMS systems. By performing Snmpget, the SLA MRS can also verify the existence, name, and connectivity of a device before being entered into a PE database. The SLA GUI can present an integrated view of separate EMS systems components. The SLA MRS application may not use a database. Conversely, the SLA MRS application can fetch the configuration files from the target EMS systems. This has the dual benefit of always providing the User with the latest real-time configurations and minimizes the complexity of the SLA MRS application.

An important task of the ENOC is to utilize the PE to deploy SAA agent probes to collect data for SLA and CNM. Although the PE provides a GUI for many of these functions, it is heavily dependent on eXtensible Markup Languages (XML) to activate those functions. Editing of XML is both time consuming and error prone. In addition there are several inventory functions regarding assigning of network elements to collection groups which the PE does not provide. The SLA-MRS application has the ability to perform these tasks through its integration capabilities and the SLA GUI.

Through the SLA GUI, the SLA-MRS application can allow a user to verify configurations, ping devices, auto assign devices in groups, forecast servers, etc. The SLA-MRS application can be a Java Servlet, which can use an HTTP interface to execute enoc.jsp and enocHdlr.jsp Java Server Pages (JSP) loaded on the PE server. A user can access the SLA-MRS application and the SLA GUI using a standard Web Browser.

Figure 9:
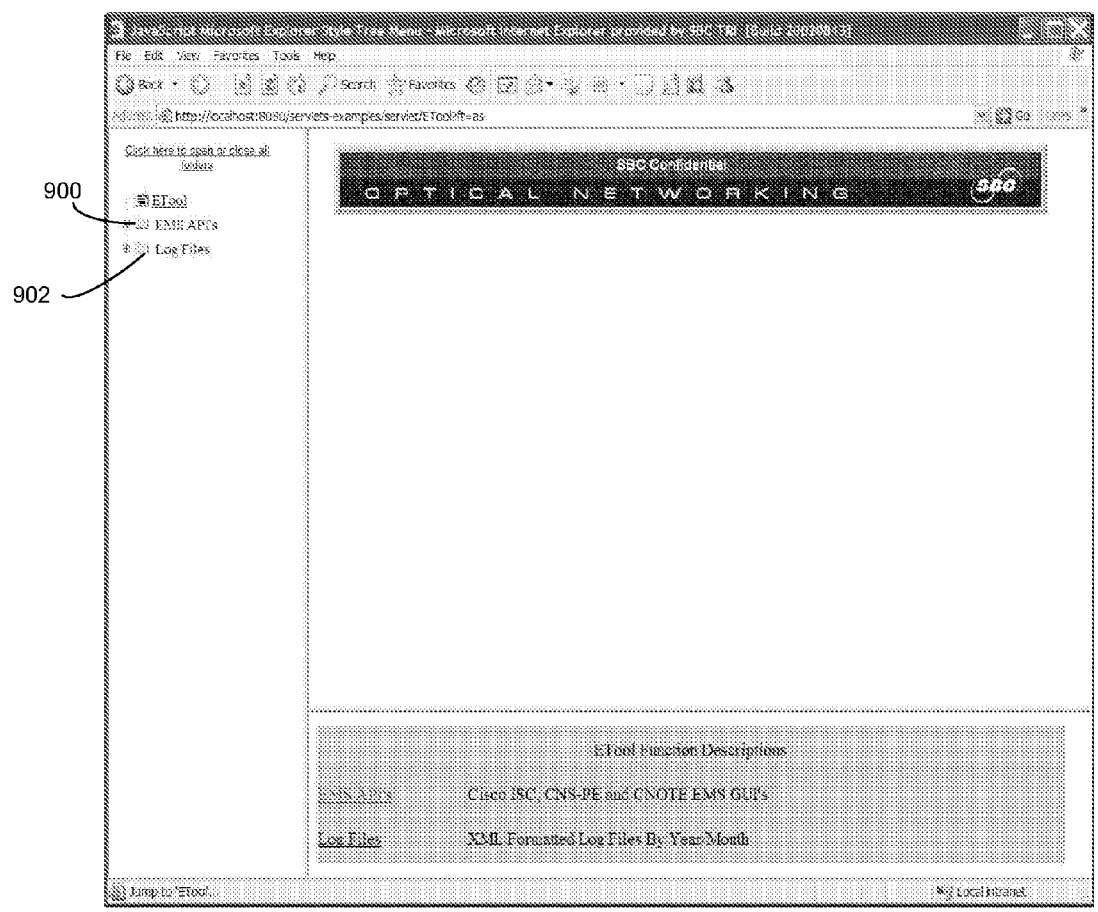
FIG. 9 through FIG. 30 illustrate various pages of a graphical user interface for managing one or more service level agreements within a switched metro Ethernet.
Figure 10:
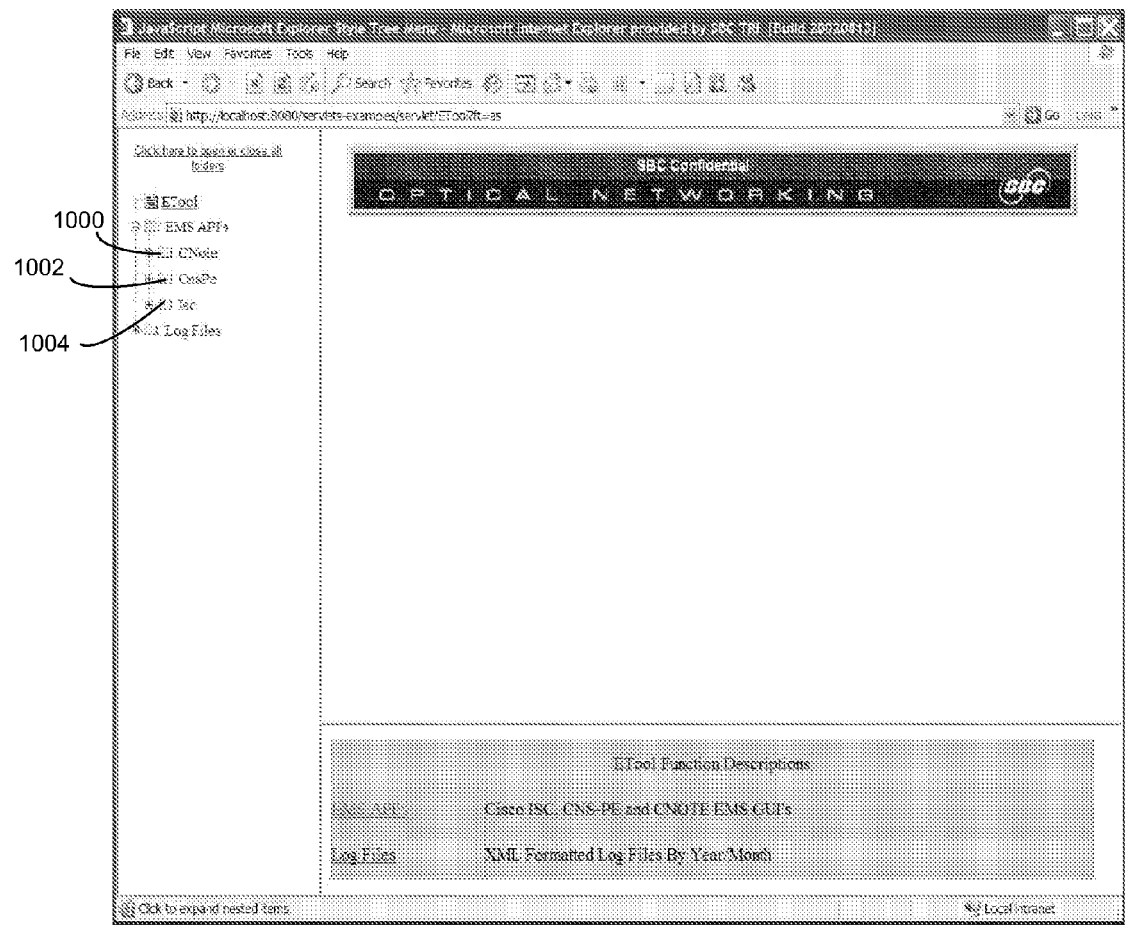
Figure 11:
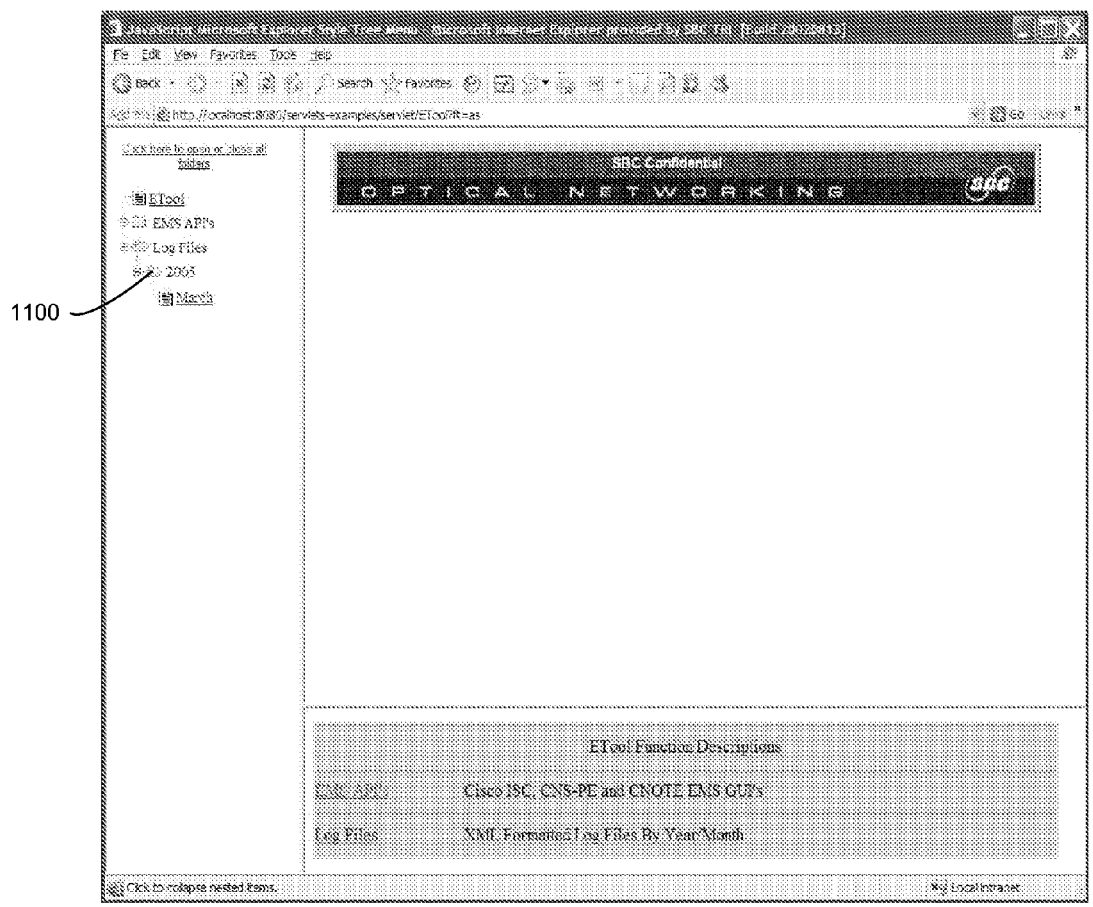

Activating the SLA-MRS application presents the user with the main screen shown in FIG. 9. The main screen can include an EMS API's folder 900 that provides access to the EMS functionality. As shown in FIG. 10, selecting the EMS API's folder, 900, can display separate folders 1000, 1002, 1004 for each of the supported components, e.g., a CNOTE, a CNS PE, and an ISC. The information displayed can be derived from one or more SOAP/XML files. The main screen can also include a Log Files folder 902 that, when selected, displays the XML formatted Log Files 1100 created by the SLA-MRS application, shown in FIG. 11.

Figure 12:
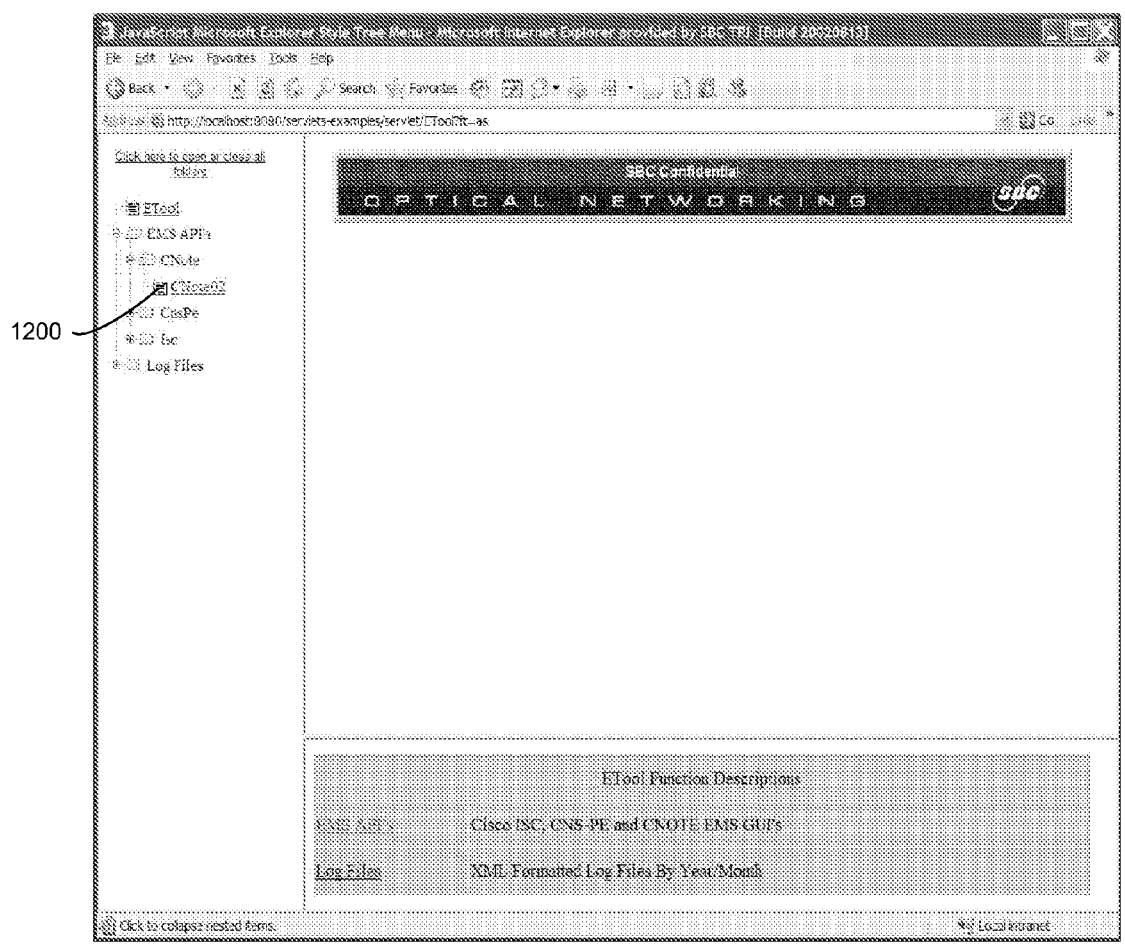
Figure 13:
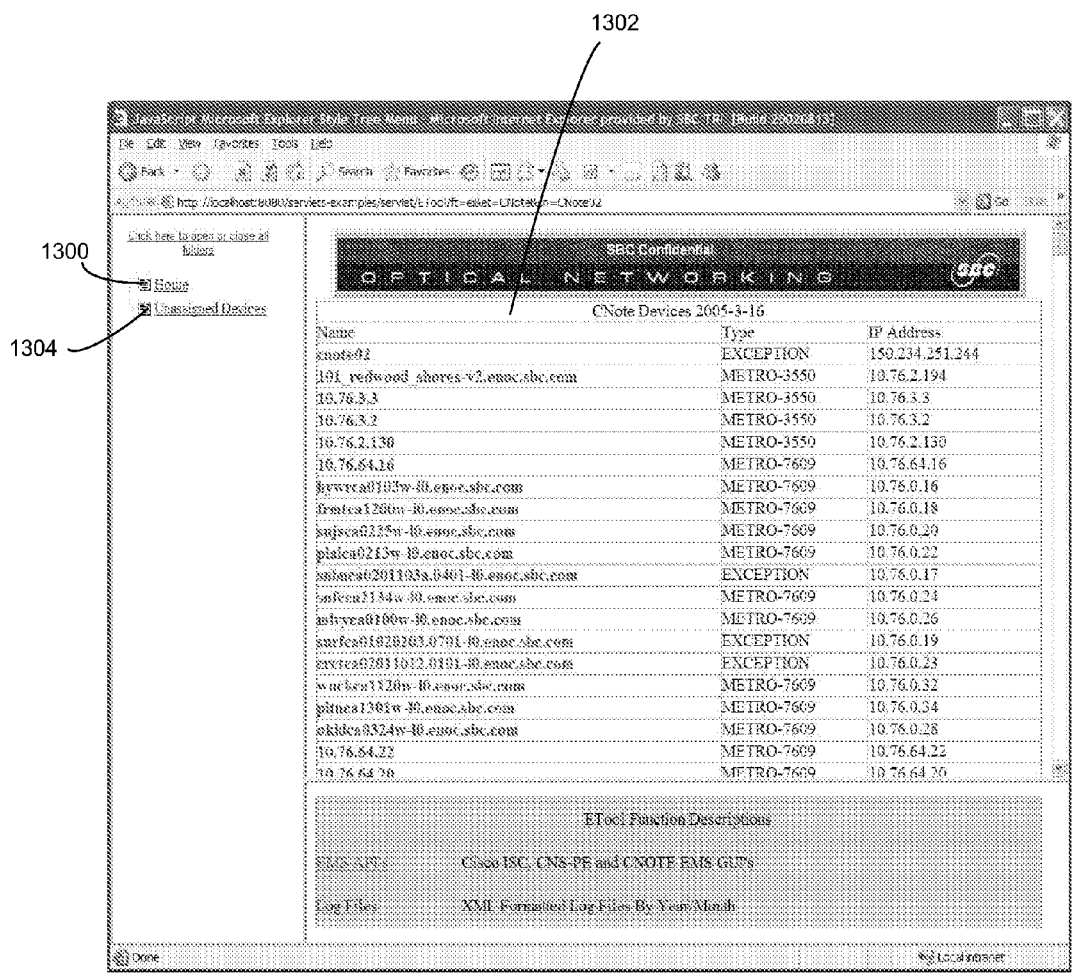

Referring to FIG. 12, if the CNOTE folder 1000 is selected, a subfolder 1200 is presented. The subfolder can be labeled CNOTE02. Selecting the subfolder 1200 can present the user with the GUI screen shown in FIG. 13. As shown in FIG. 13, the GUI can include a home button 1300. Selecting the home button 1300 can return the user to the main screen, shown in FIG. 9. An informational middle frame 1302 can display all the core and edge devices that the CNOTE platform supports along with their IP Addresses. The type field can define the type of device, METRO or CSME. The EXCEPTION type refers to those devices with IP Addresses defined in an XML File DeviceExceptions.xml or those that don't match the FilterRules.xml that define the type (METRO/CSME) for a particular device. These exception devices could be Lab Test Devices or devices incorrectly entered into the CNOTE system. Those Exception devices can be logged in the SLA-MRS application XML log files so that ENOC personnel can examine and correct any inconsistencies.

FIG. 13 also shows that the GUI can include an unassigned devices button 1302. When the unassigned devices button 1302 is selected, the user is presented with the GUI screen shown in FIG. 14. As shown, the middle frame 1302 can display all devices in CNOTE that are not assigned to Groups within CNS-PE. This can be determined by comparing the configuration file of CNOTE against all CNS-PE configurations. The Auto Assign Devices column presents the user with the ability to assign all unassigned devices for data collection. The SLA-MRS application can determine the optimal spreading of the devices across systems and groups based on the number and type of device each CNS-PE platform is currently supporting. The last two (2) columns show the optimal system and group which the SLA-MRS application can assign the particular device to. Selecting a particular device 1400 from the Name column triggers functionality associated with that individual unassigned device, shown in FIG. 15.

Figure 15:
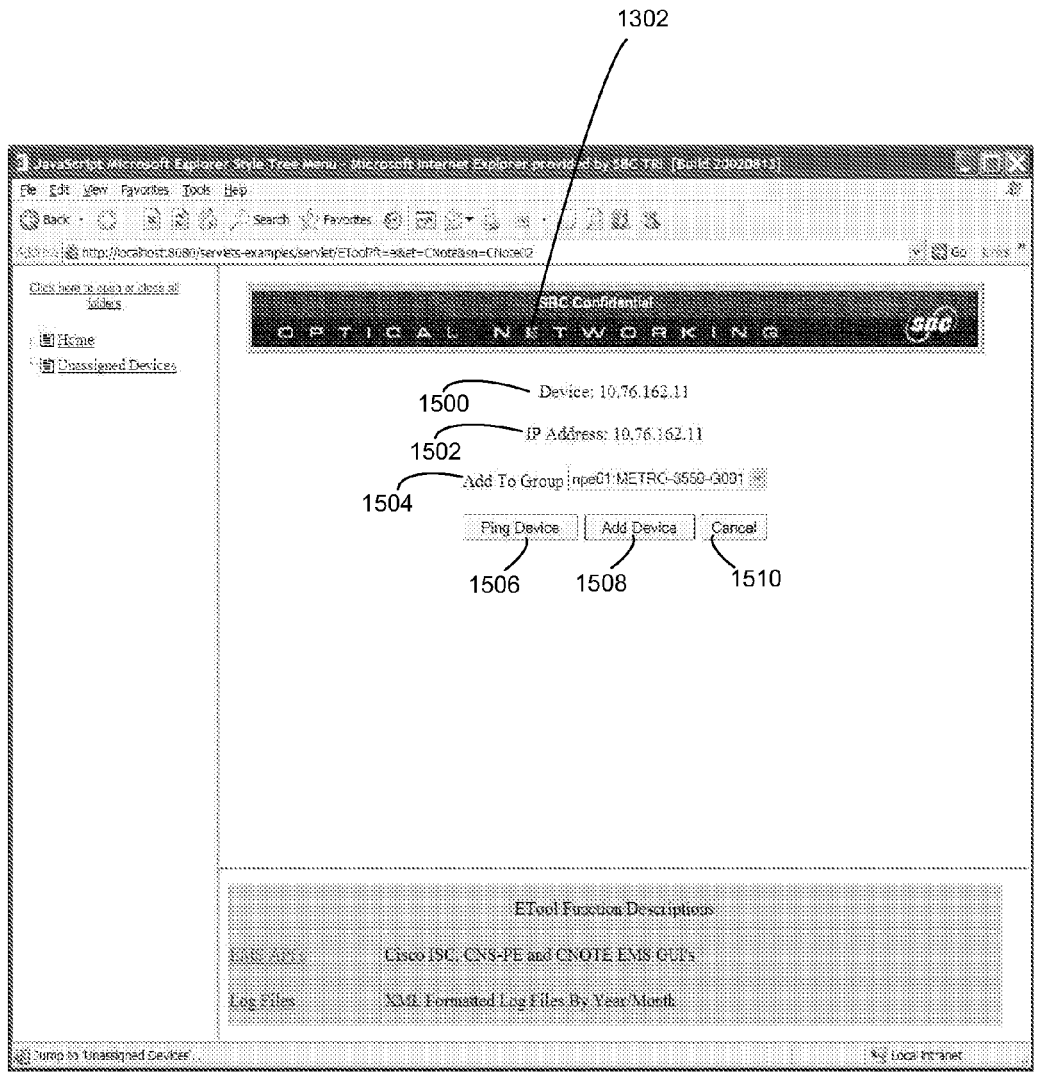

FIG. 15 shows that the GUI can include a device name 1500, an IP address 1502, and an add to group drop down menu 1504. Further, the GUI can include a ping device button 1504, an add device button 1508, and a cancel button 1510. Selecting the ping device button 1504 can execute an Snmpget which can return the sysName of the device. In the case of an exception, the user can be presented with NO_CONNECT for a timeout or a device not reachable due to a firewall issue or with CUST_REPEATER for a device that is a customer repeater. Selecting the add device button 1508 can execute the Snmpget and add the device to a system and group selected from the drop down menu 1504—if the device is not an exception.

Figure 16:
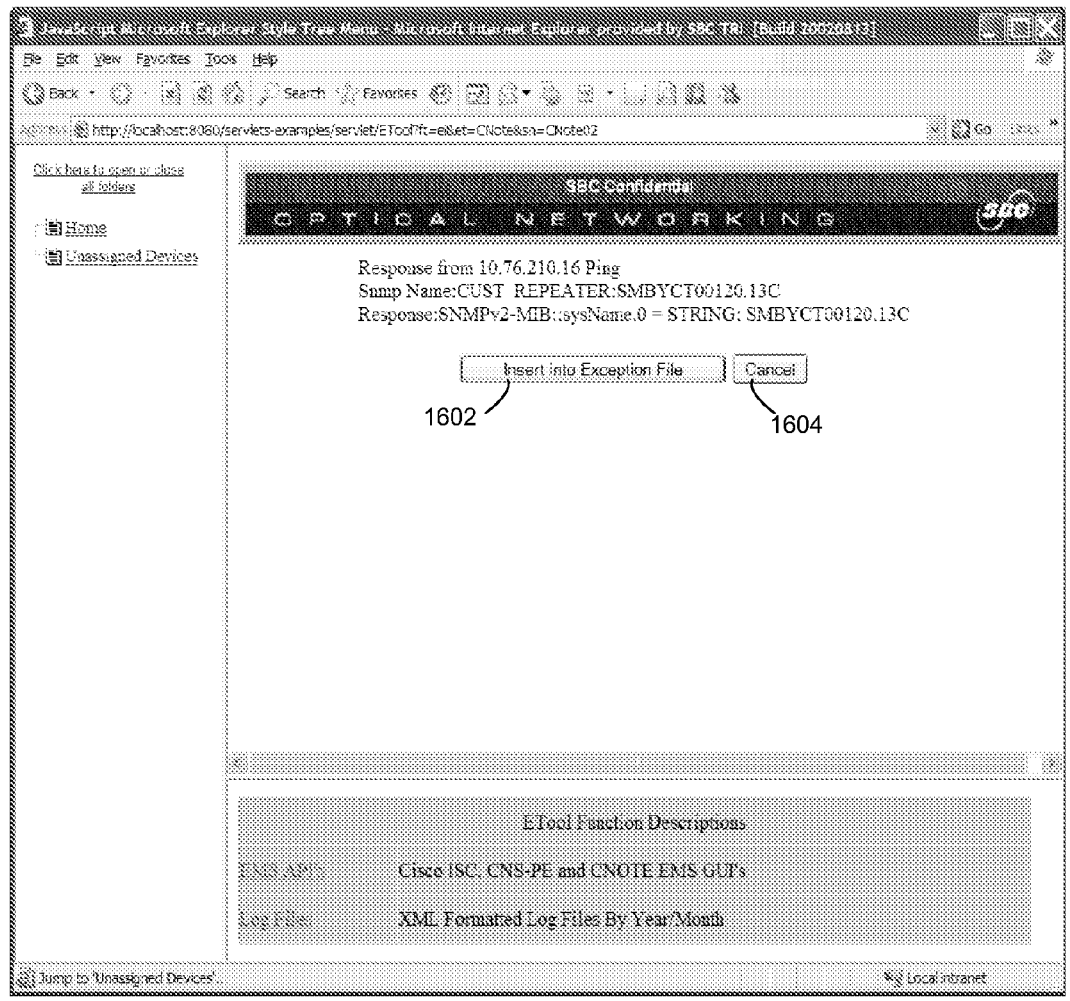

When the ping device button 1506 is selected, the user is presented with the GUI screen shown in FIG. 16. FIG. 16 shows that the GUI can include an insert into exception file button 1602 and a cancel button 1604. If the insert into exception file button 1602 is selected the IP address of the selected device can be included in an exception file, DeviceExceptions.xml. This can enable the user to add devices such as customer repeaters to the exception file so these devices do not appear in the list of devices to add each time the auto add is run.

Figure 14:
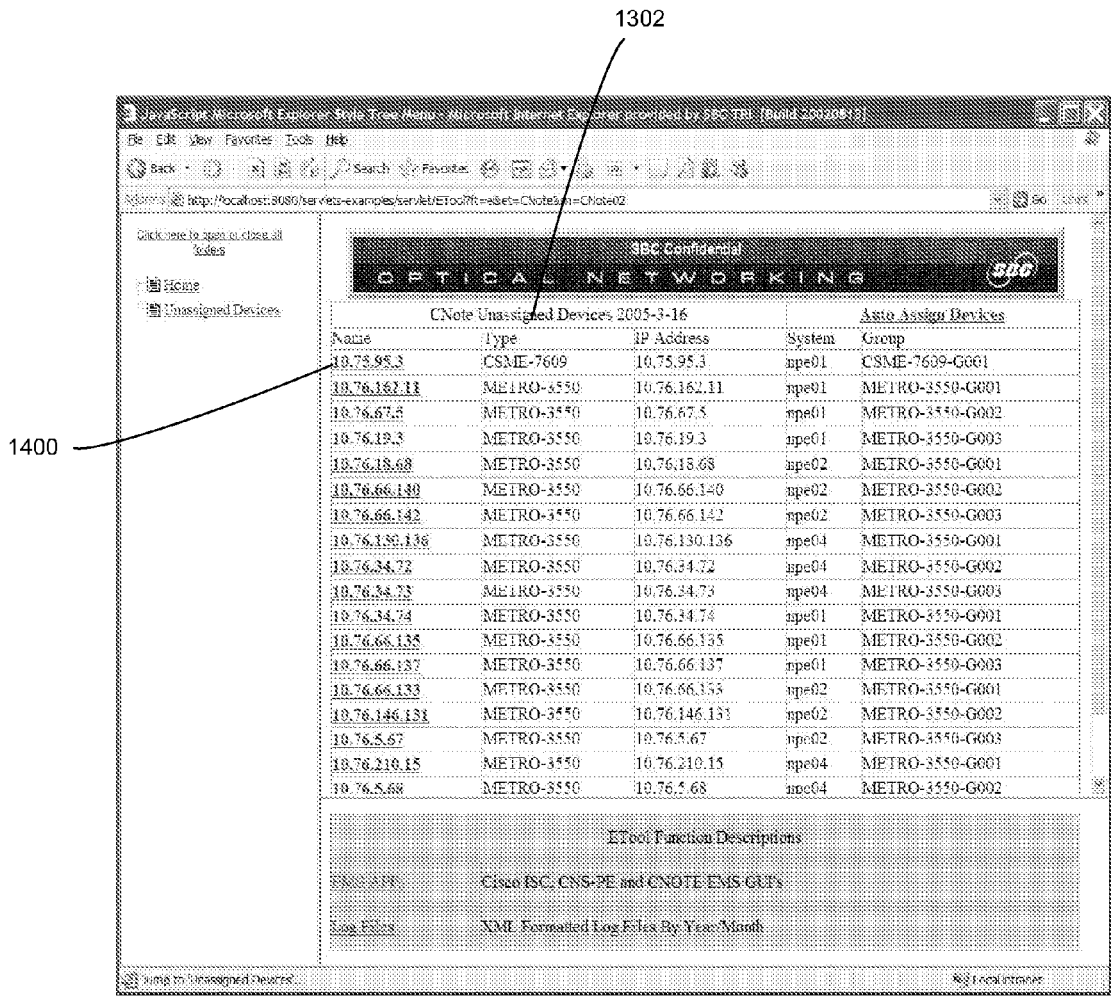
Figure 17:
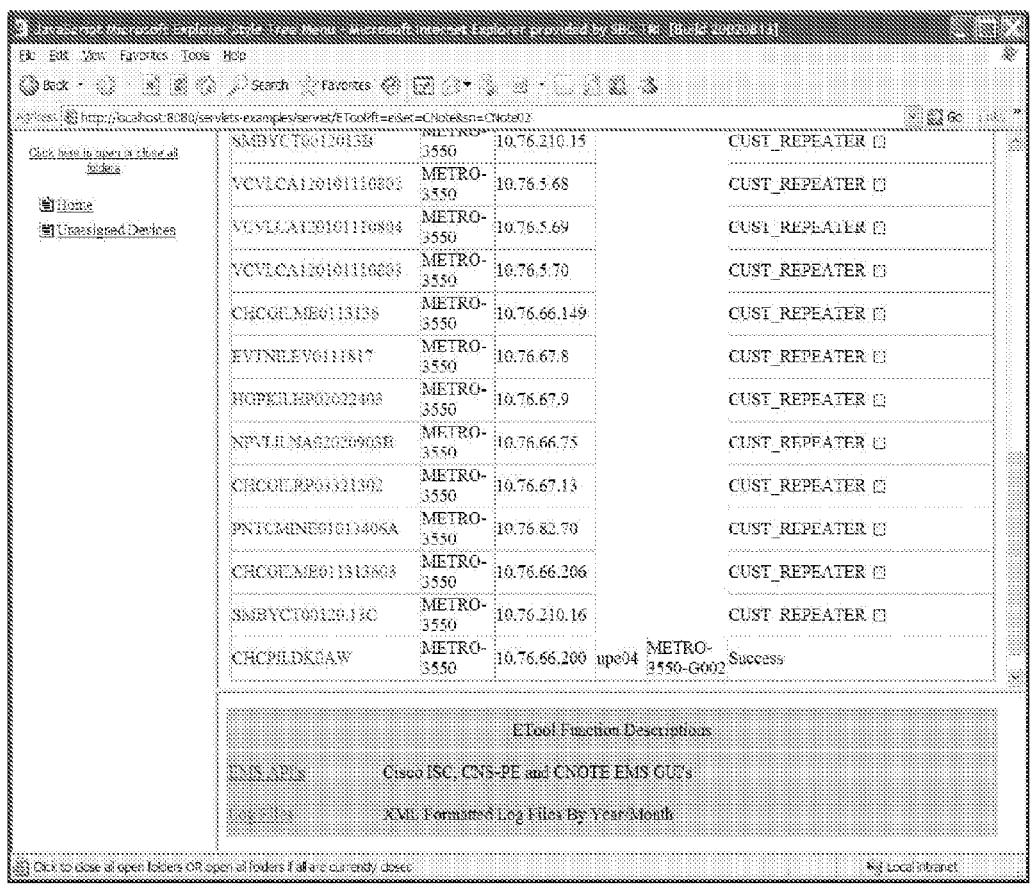
Figure 18:
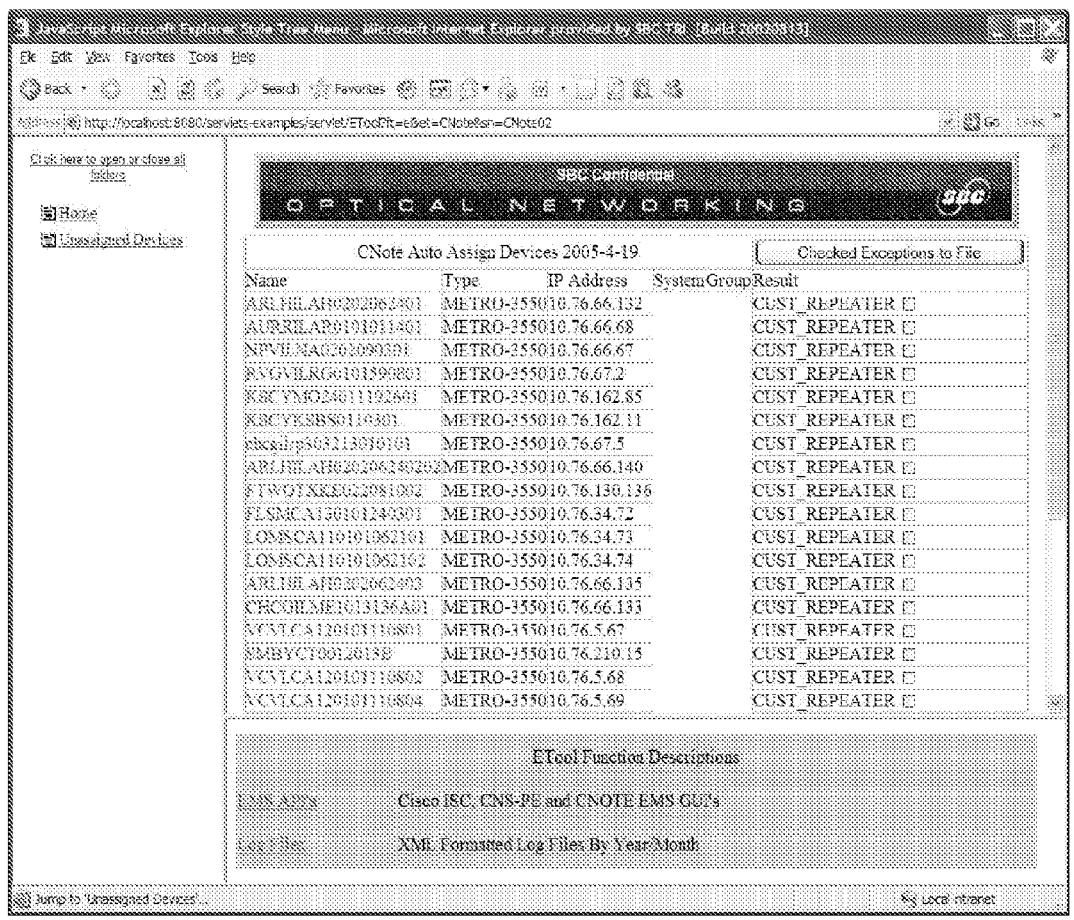

Selecting auto assign devices at FIG. 14 can execute a bulk add of all unassigned devices optimally spread across all active CNS-PE platforms. An example of the results are shown in FIG. 17. As shown in FIG. 18, the insert into exception feature can also be available when the auto assign devices screen is shown. Each checked device can be added to the exception file.

Figure 19:
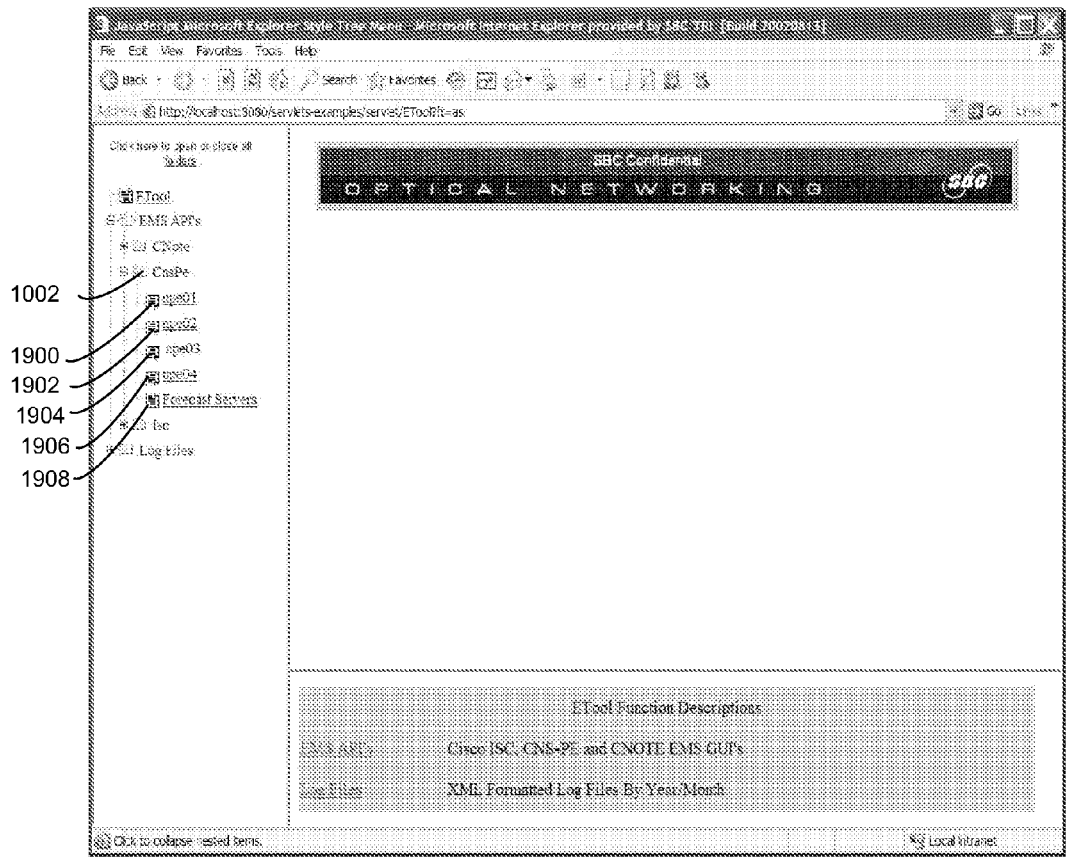

Referring to FIG. 19, when the CNS-PE folder 1002 is selected, the user can be presented with individual CNS-PE systems 1900, 1902, 1904, 1906 and a forecast servers file 1908. Selecting a specific system 1900, 1902, 1904, 1906 can instruct the SLA-MRS application to pull the XML formatted configuration from the CNS-PE system and parse it results. Selecting the forecast servers file 1908 can calculate the number of CNS-PE servers required to support the devices specified.

Figure 20:
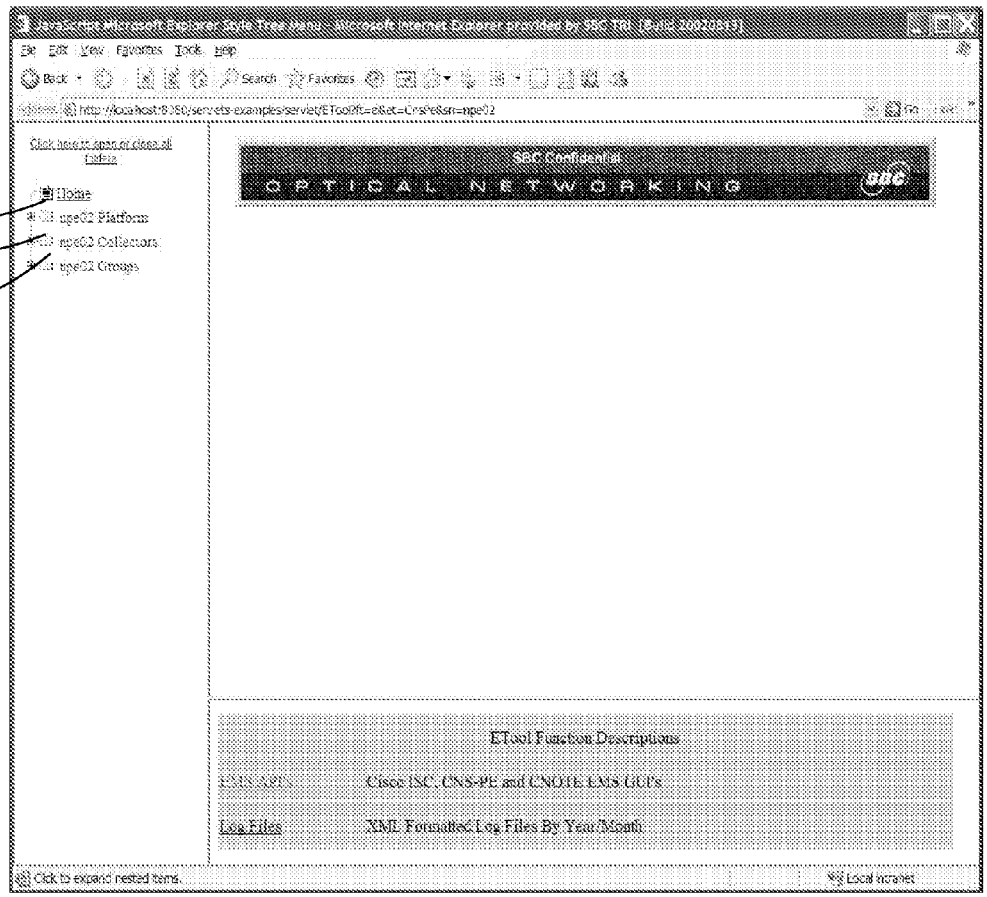

FIG. 20 illustrates one or more folders that can be presented to a user when a particular CNS-PE system 1900, 1902, 1904, 1906 is selected. As shown, the folders can include a platform folder 2000, a collectors folder 2002, and a groups folder 2004. The platform folder 2000 can include specific platform functions. The collectors folder 2002, when selected, can display the individual performance statistic collectors configured on the system. Further, the groups folder 2004 can list all groups configured on the CNS-PE platform and the devices within those groups.

Figure 21:
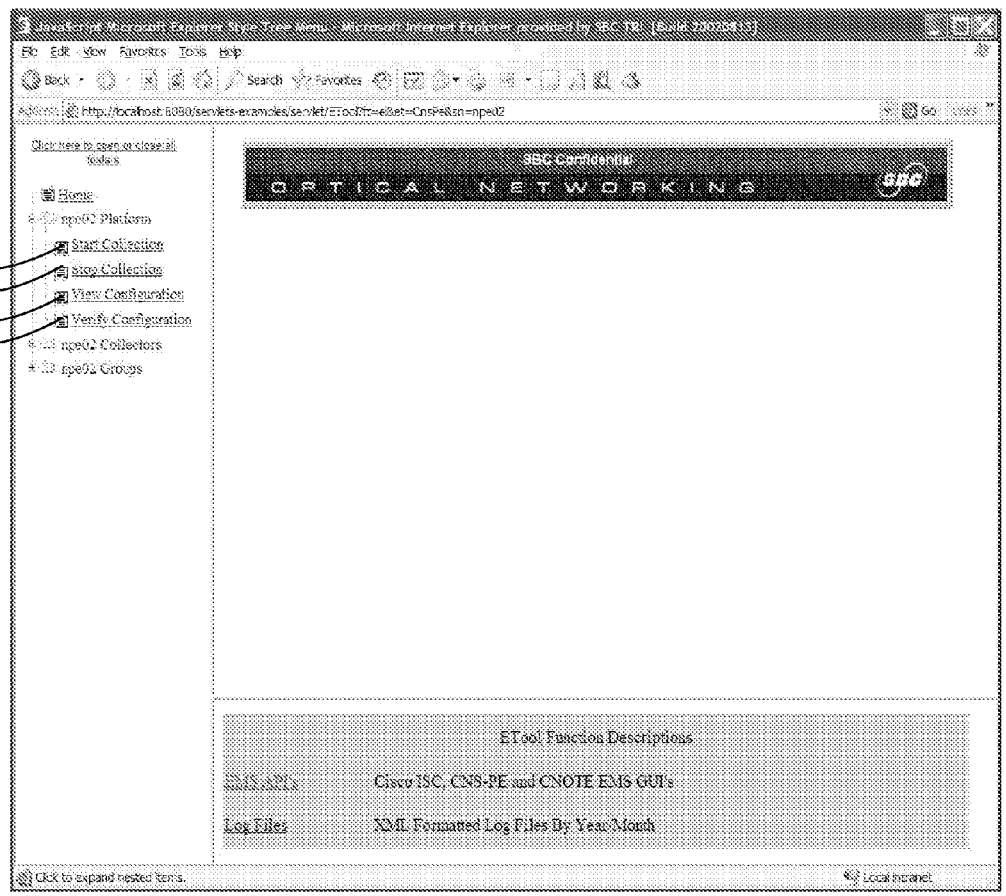
Figure 22:
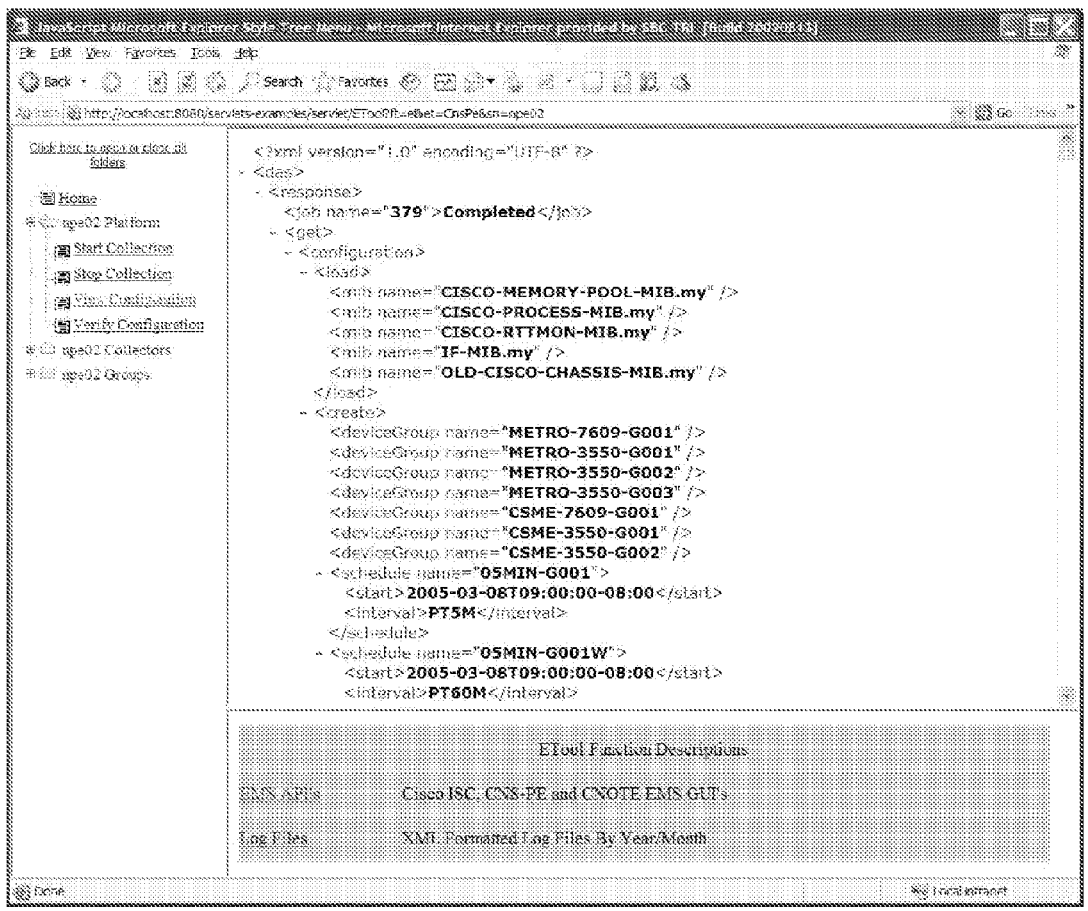

When the platform folder 2000 is selected, the user is presented with specific platform functions, shown in FIG. 21. These functions can include start collection 2100, stop collection 2102, view configuration 2104, and verify configuration 2106. Start collection 2100 and stop collection can toggle the collection status of a particular CNS-PE platform. View configuration 2104 can pull the current configuration from the CNS-PE system and display it in a raw XML form as shown in FIG. 22. Verify configuration 2106 can include an integrated function between the CNOTE and the particular CNS-PE system. It can compare the two systems and report on those devices that are configured in CNS-PE but do not appear in CNOTE.

Figure 23:
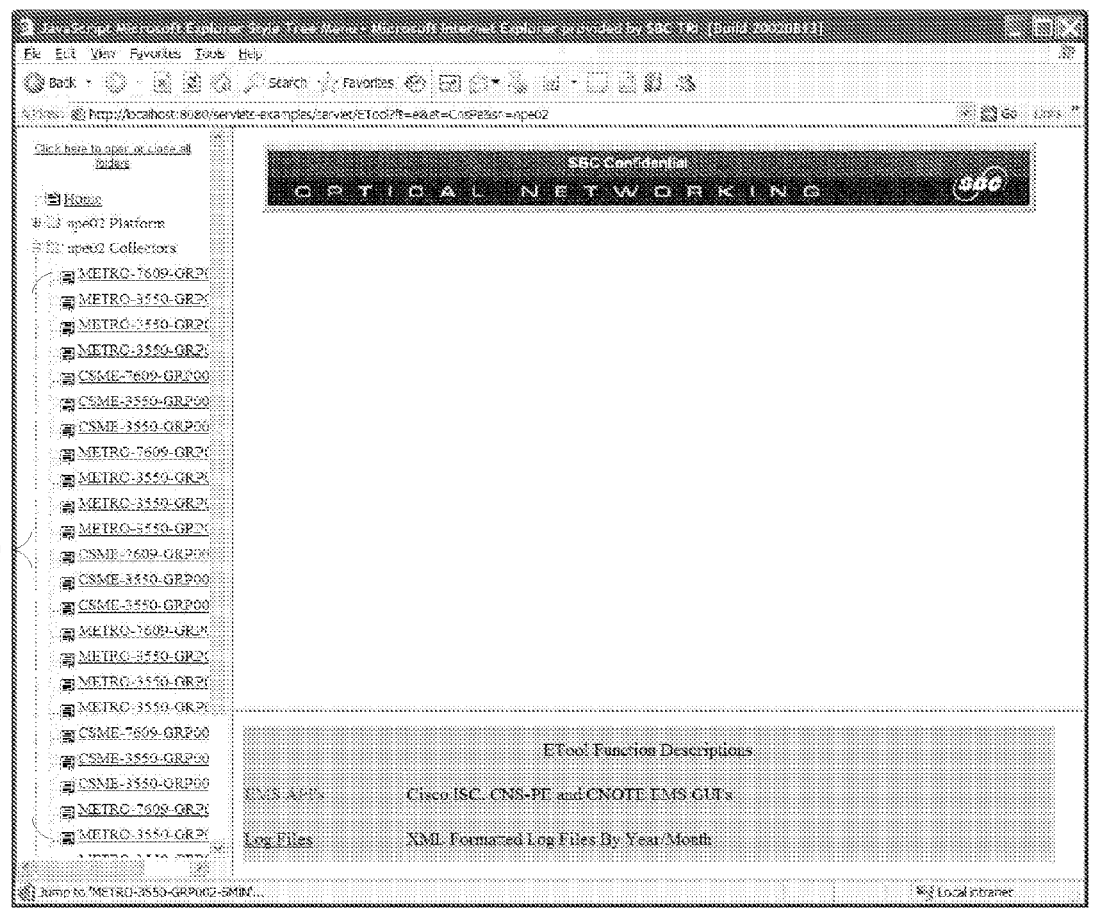
Figure 24:
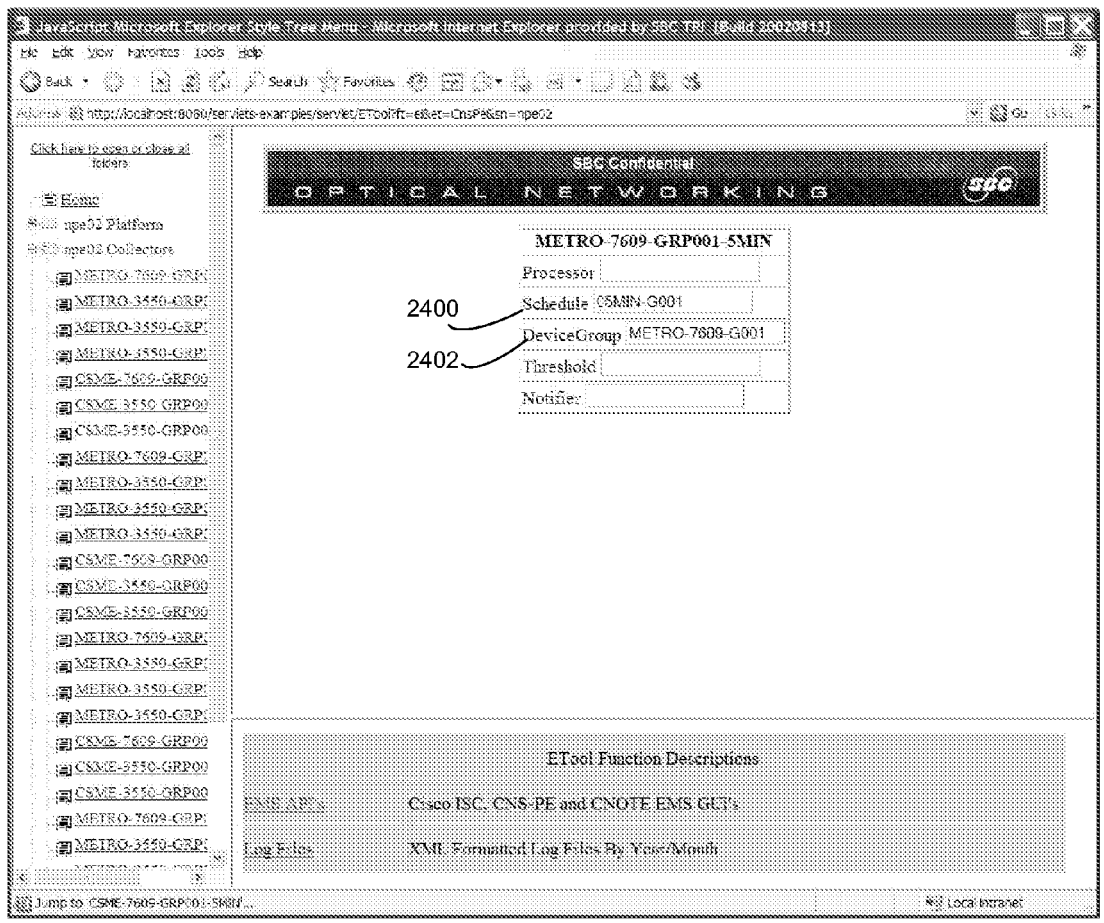

Selecting the collectors folder 2002 at FIG. 20, can present the user with a list of all individual performance collectors on the CNS-PE system. FIG. 23 illustrates such a list of collectors 2300. Selecting an individual collector 2300 can present the user with the configuration of the collector in a form shown in FIG. 24. As shown in FIG. 24, each collector can include a collection schedule 2400 and the device type 2402 that the collector is controlling.

Figure 25:
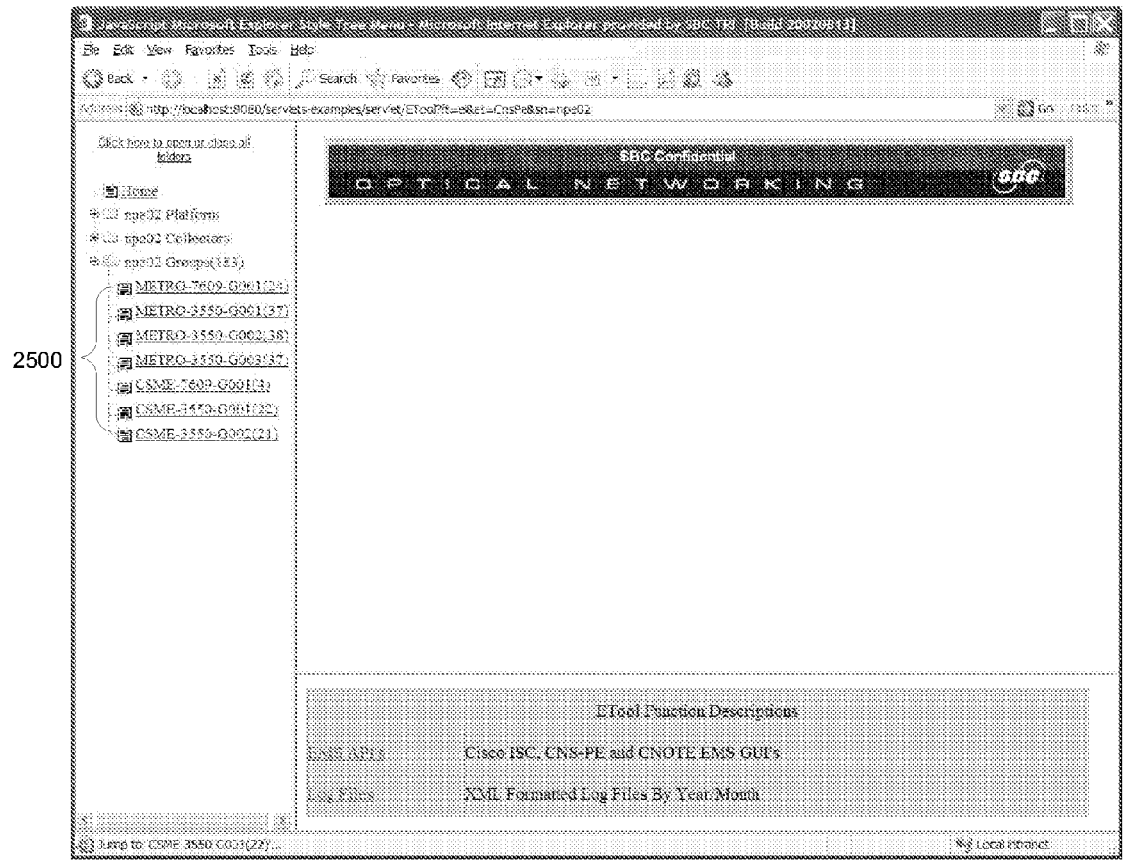

Returning briefly to FIG. 20, when the groups folder 2004 is selected, a list of collection groups can be presented to the user, as shown in FIG. 25. Each group 2500 can include particular devices, e.g., core or edge, and particular services, e.g., METRO or CSME. The SLA-MRS application can use these names in conjunction with device type lookup logic to correctly assign a device to a corresponding group on a CNS-PE platform. Moreover, a count of devices in each group 2500 and a total count of devices for all groups in the CNS-PE platform can be shown next to each group name.

Figure 26:
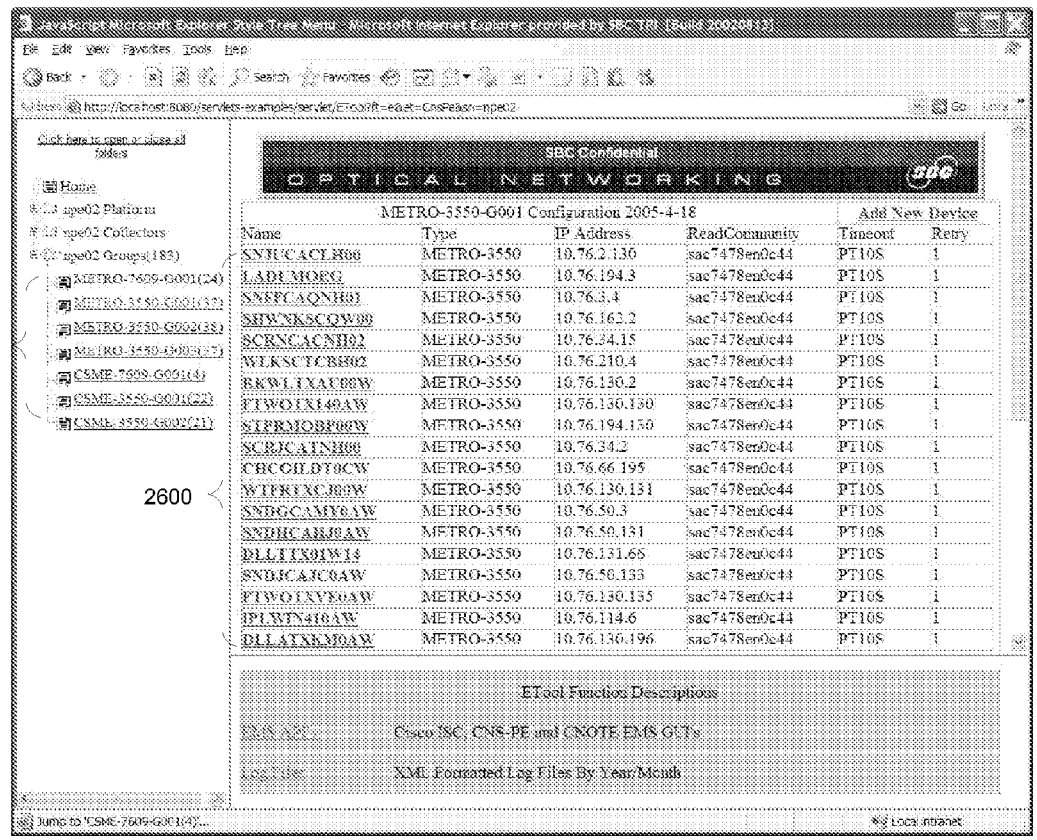
Figure 27:
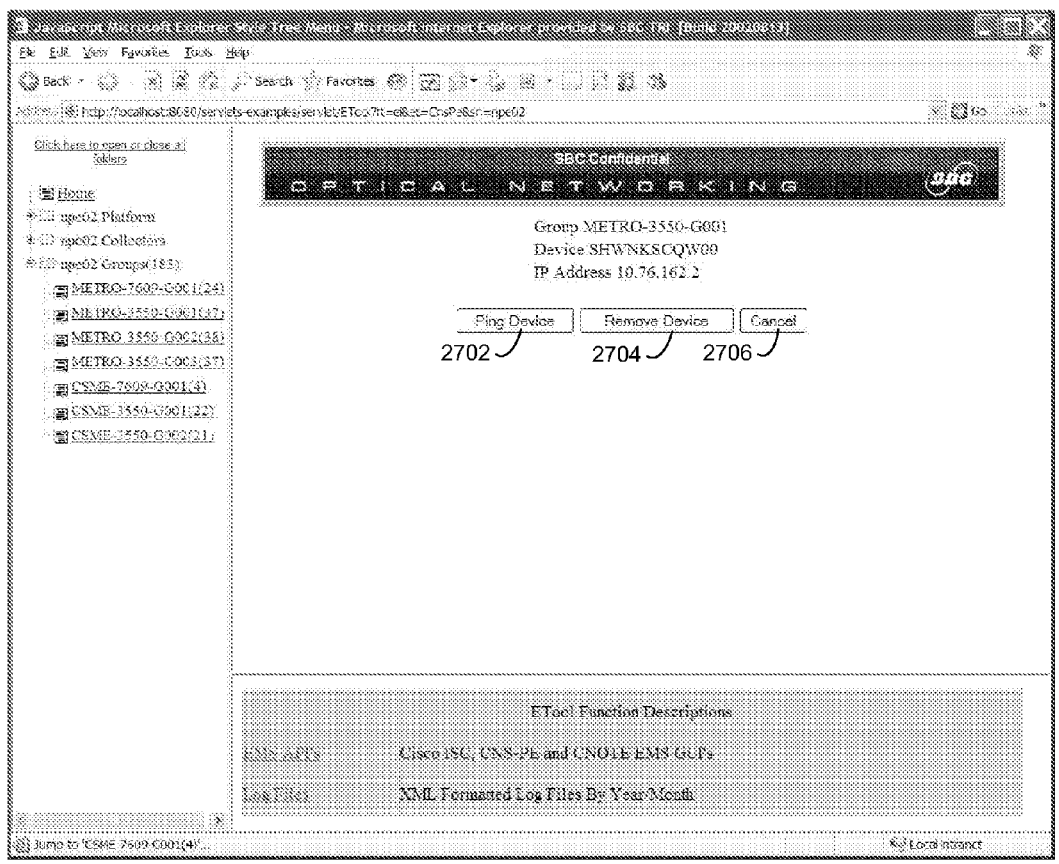

Selecting a specific group 2500 at FIG. 25, can display all the devices in that group 2500, as shown in FIG. 26. If an individual device 2600 is selected, the user can be presented with the GUI screen shown in FIG. 27. As shown in FIG. 27, the GUI can further include a ping device button 2702, a remove device button 2704, and a cancel button 2706. If the ping device button 2702 is selected, the previously described Snmpget can be performed. If the remove device button 2704 is selected, the selected device can be removed from the group and out of the statistics collection associated with the group.

Figure 28:
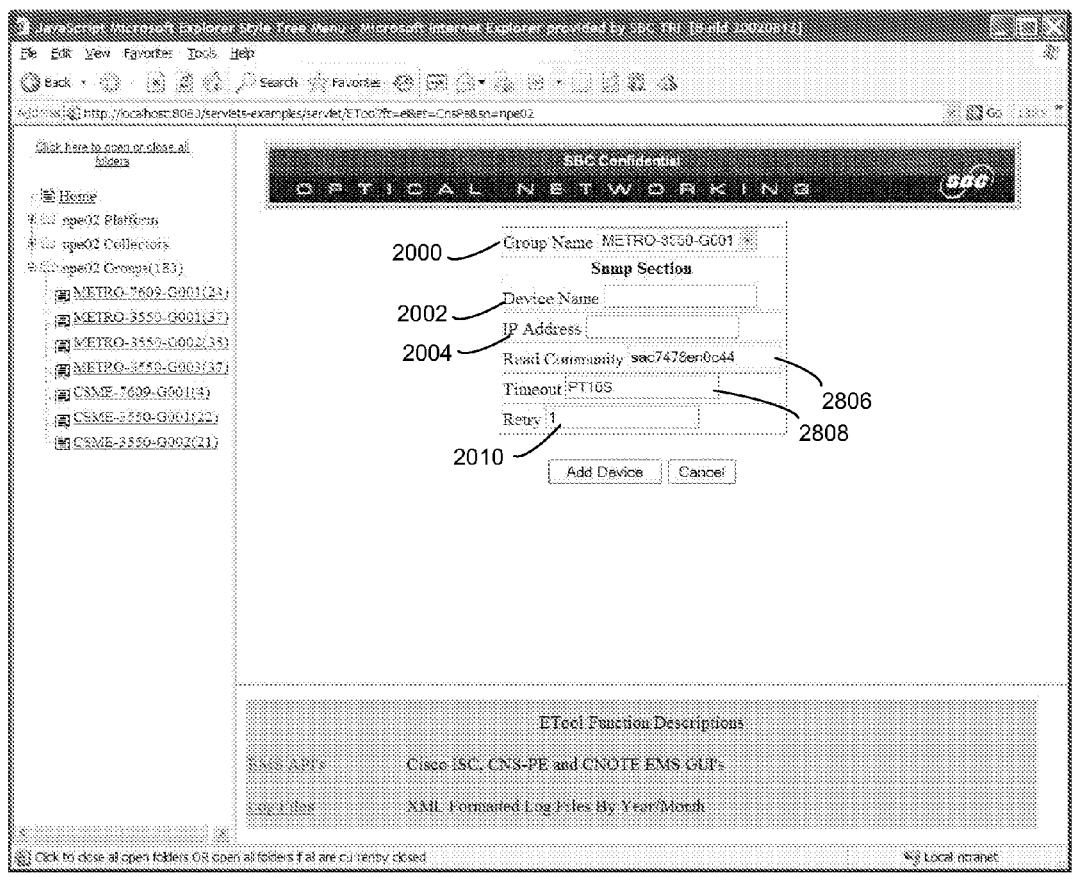

Returning to FIG. 26, when add new device is selected, the user can be presented with a form to add a new device to a selected group, shown in FIG. 28. The add new device screen can include a group name drop down menu 2800, a device name input window 2802, an IP address input window 2804, a read community input window 2806, a timeout input window 2808, and a retry input window 2810. An add device button 2812 and a cancel button 2814 can also be included. Adding a device to a group can be performed as previously described.

Figure 29:
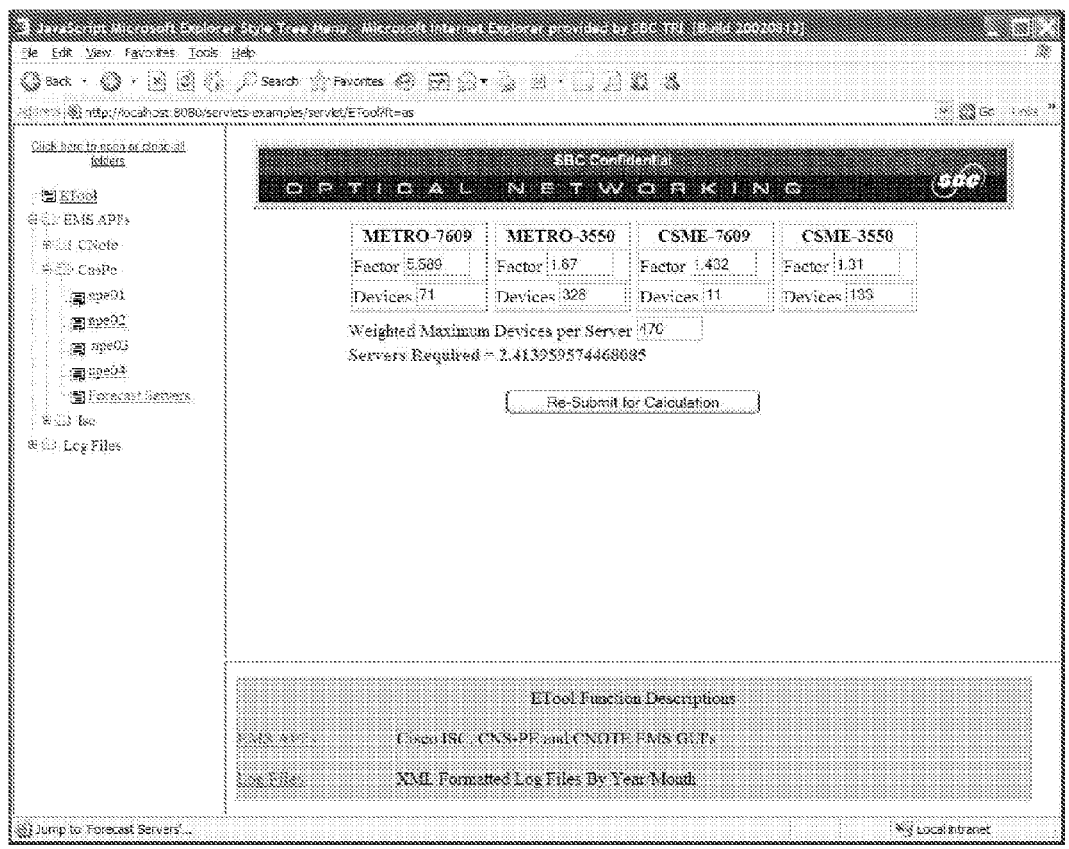

Returning to FIG. 19, when forecast servers 1908 is selected, the user can be presented with the screen shown in FIG. 29. An initial execution can return calculations based on default values for factors, weighted maximum devices per server, and the current number of devices supported by the active CNS-PE servers. Changing any of the parameters and selecting a Re-Submit for Calculation button 2900 can recalculate the servers required based on these new values. Weighted maximum devices per server is a derived value determined by the mix of device types as some devices (METRO-Core) take more system resources than others. This can allow forecasters to predict a number of CNS-PE servers needed to handle device growth.

Figure 30:
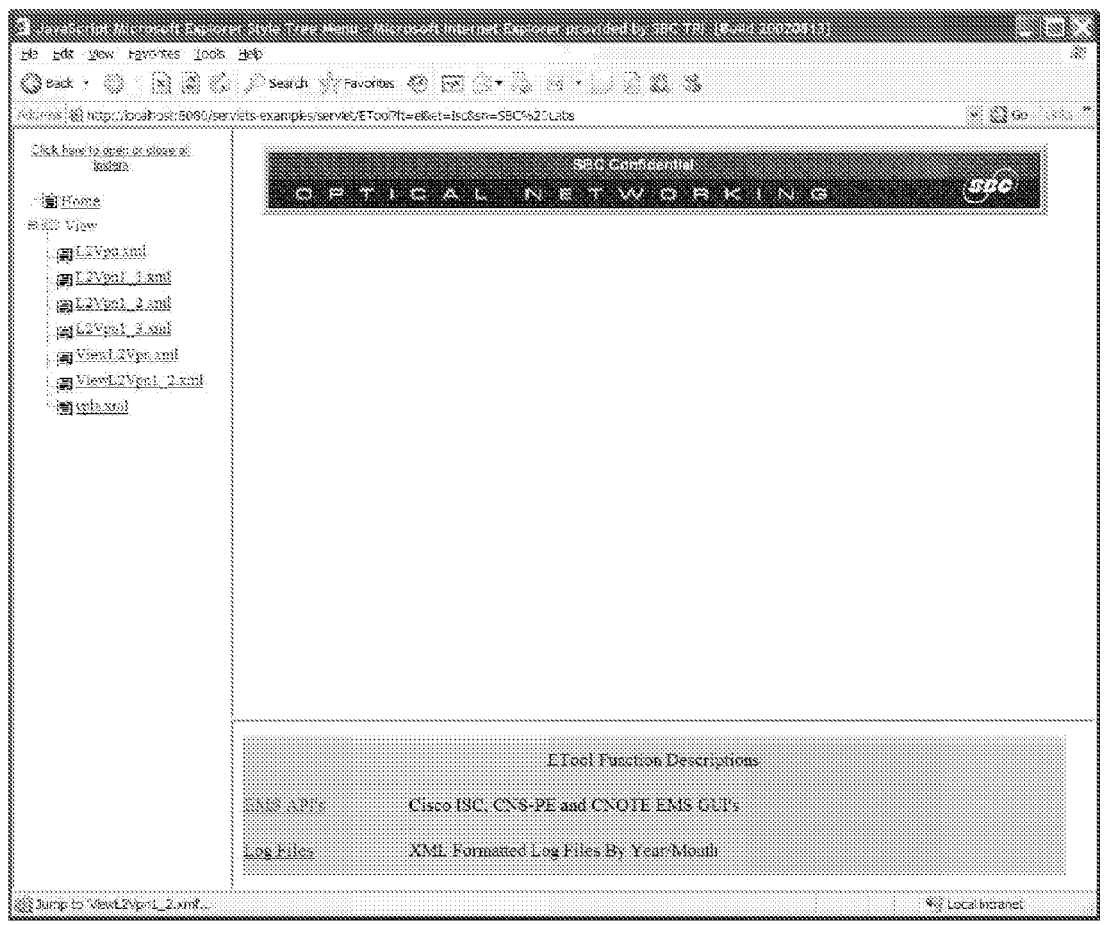

Returning to FIG. 10, selecting the ISC folder presents the user with the GUI screen shown in FIG. 30. The user can select canned SOAP/XML files 3000 created to interface with a solution center system.

In a particular embodiment, the SLA-MRS application can include a plurality of supporting files that can be used to provide the above described capabilities. A file such as, EmsApi.xml can provide the SLA-MRS application with the information necessary to interface with an individual EMS. Each EMS is defined within the <ems> tags as shown in the below XML snippet. A <directory> tag provides the folder name within a directory for information files that are unique for this EMS. A <type> tag contains the specific EMS type i.e. CNS-PE. A <system> tag defines the EMS(s) of this type. Included within this tag is unique information to access this specific EMS system.

A tag <sysname> has the system name of this EMS. A <securityfile> tag can provide the file name which is used to access a specific EMS. That can include a keystore file, an XML file or any other file which the SLA-MRS application invokes to gain access to the EMS. A <login> and <password> tag may be required to gain access to the EMS's NBI. A <url> tag is used to access the EMS and a <status> tag defines whether this EMS is currently active and thus accessible, active_full active but not accepting new devices, or inactive and not accessible. The SLA-MRS application can use this file to define access to the appropriate systems but also to define the folders described herein. Any other supporting files unique to a particular EMS can be contained in sub-folders named for the EMS, i.e. ISC.

XML snippet for an EMS.

```
<ems>
    <directory>Isc</directory>
    <type>Isc</type>
    <system>
        <sysname>SBC Labs</sysname>
        <securityfile>CreateSession.xml</securityfile>
        <login>xxx</login>
        <password>xxx</password>
        <url>http://1.1.1.1:8030/soap/servlet/messagerouter</url>
        <status>active</status>
    </system>
</ems>
```

A DeviceExceptions.xml XML/SOAP file, shown below, lists all IP Addresses that are not to be included into the CNS-PE collections.

```
≈<SOAP:Body>
≈<exception>
    <type>EXCEPTION</type>
    <ip>10.76.66.67</ip>
    </exception>
≈<exception>
    <type>EXCEPTION</type>
    <ip>10.76.66.68</ip>
    </exception>
≈<exception>
    <type>EXCEPTION</type>
    <ip>10.76.66.132</ip>
    </exception>
≈<exception>
    <type>EXCEPTION</type>
    <ip>10.76.67.2</ip>
    </exception>
≈<exception>
    <type>EXCEPTION</type>
    <ip>10.76.162.82</ip>
    </exception>
≈<exception>
    <type>EXCEPTION</type>
    <ip>10.76.162.85</ip>
    </exception>
</SOAP:Body>
```

A FilterRules.xml file, shown below, defines the type of device in relation to its IP Address. This file in conjunction with DeviceExceptions.xml determines IP Address Exceptions. It also determines the type of device which facilitates the selection of the group in CNS-PE that this device should be included in for statistics collection.

```
≈<SOAP:Body>
≈<devicetype>
    <type>CSME</type>
    <device>7609</device>
≈<ipaddress>
    <ipa>10</ipa>
    <ipb>75</ipb>
    <ipc>31</ipc>
    </ipadress>
≈<ipaddress>
    <ipa>10</ipa>
    <ipb>75 </ipb>
    <ipc>63</ipc>
    </ipaddress>
≈<ipaddress>
    <ipa>10</ipa>
    <ipb>75</ipb>
    <ipc>95</ipc>
    </ipaddress>
    </ipaddress>
    </devicetype>
≈<devicetype>
    <type>CSME</type>
    <device>3550</device>
≈<ipaddress>
    <ipa>10</ipa>
    <ipb>75</ipb>
    <ipc>0-19</ipc>
    </ipaddress>
≈<ipaddress>
    <ipa>10</ipa>
    <ipb>75</ipb>
    <ipc>32-51</ipc>
    </ipaddress>
≈<ipaddress>
    <ipa>10</ipa>
    <ipb>75<ipb>
    <ipc>64-87</ipc>
    </ipaddress>
    </devicetype>
≈<devicetype>
    <type>METRO</type>
    <device>7609</device>
≈<ipaddress>
    <ipa>10</ipa>
    <ipb>76</ipb>
    <ipc>mod 16=0</ipc>
    <ipd>even</ipd>
    </ipaddress>
    </devicetype>
≈<devicetype>
    <type>METRO</type>
    <device>3550</device>
≈<ipaddress>
    <ipa>10</ipa>
    <ipb>76</ipb>
    <ipc>mod 16!=0</ipc>
    <ipd>even</ipd>
    </ipaddress>
    </devicetype>
</SOAP:Body>
```

A file entitled enoc.jsp shown below, is a Java Server Page located in a directory on each CNS-PE platform. The SLA-MRS application can handle the http interaction between the SLA-MRS application and the CNS Integration Bus which CNS-PE uses to communicate with its database. The code snippet below from enoc.jsp demonstrates the interaction with the CNS bus to remove a device from the CNS-PE Group. Parameters are passed using the standard http argument passing. The below example would have the type, grpnm and devnm passed as parameters.

```
else if (type.equals("rmv"))
    xml = "<das><remove>" +
        "<deviceGroup name=\"" + grpnm + "\">" +
        "<device name=\"" + devnm + "\" />" +
        "</deviceGroup>" +
        "</remove></das>";
```

The code below from enoc.jsp shows the integration with the CNS Bus.

```
try {
    prop.load(new FileInputStream(configFile));
    InputStream is = Password.getPasswordsFromDB();
    if ( is != null ) {
        prop.load(is);
        is.close();
```

-continued

```
        }
        String webPassword =
prop.getProperty("web.password") .trim ( ) ;
        if (webPassword.equals(password)) {
            session.putValue("das.login", "valid") ;
            String subject = CnsHandler.send(xml) ;
            response.sendRedirect("enocHdlr.jsp?subject=" +
subject) ;
        }
        else {
            response.sendRedirect("incorrectPassword.jsp") ;
        }
    } catch (Exception e) {
        response.sendRedirect("internalError.jsp") ;
```

The code below from enocHdlr.jsp performs the actual interface to the CNS Bus.

```
        String reply = CnsHandler.getResult(subject);
        if (reply.equals("")) {
            Thread.sleep(15000);
            reply = CnsHandler.getResult(subject);
        }
            String subject = request.getParameter("subject");
```

Figure 31:
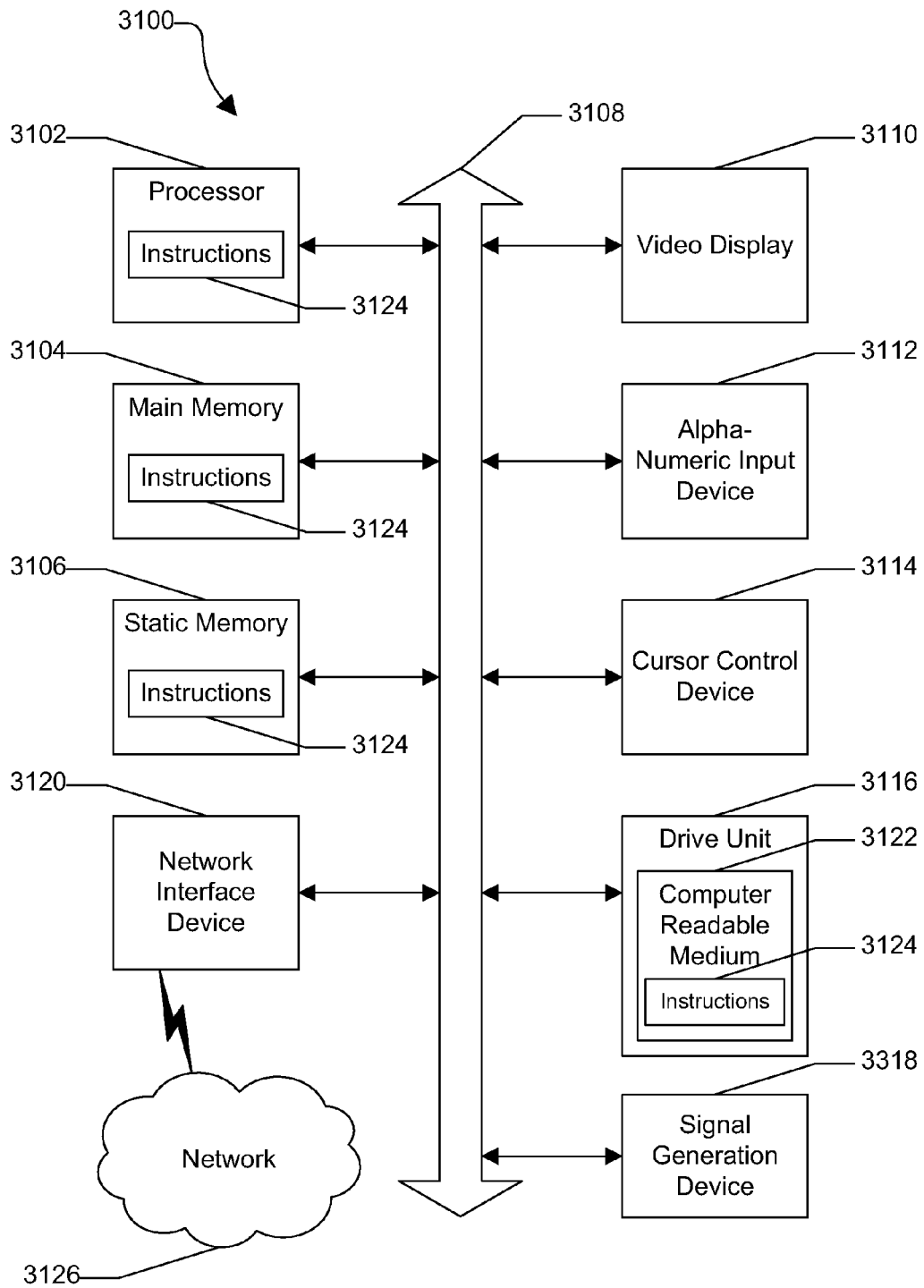
FIG. 31 is a block diagram of an embodiment of a general computing system.

Referring to FIG. 31, an illustrative embodiment of a general computer system is shown and is designated 3100. The computer system 3100 can include a set of instructions that can be executed to cause the computer system 3100 to perform any one or more of the methods or computer based functions disclosed herein. The computer system 3100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 3100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 3100 can be implemented using electronic devices that provide voice, video or data communication. Further, while a single computer system 3100 is illustrated, the term "system" shall also be taken to include any collection of systems or sub-systems that individually or jointly execute a set, or multiple sets, of instructions to perform one or more computer functions.

As illustrated in FIG. 31, the computer system 3100 may include a processor 3102, e.g., a central processing unit (CPU), a graphics processing unit (GPU), or both. Moreover, the computer system 3100 can include a main memory 3104 and a static memory 3106, that can communicate with each other via a bus 3108. As shown, the computer system 3100 may further include a video display unit 3110, such as a liquid crystal display (LCD), an organic light emitting diode (OLED), a flat panel display, a solid state display, or a cathode ray tube (CRT). Additionally, the computer system 3100 may include an input device 3112, such as a keyboard, and a cursor control device 3114, such as a mouse. The computer system 3100 can also include a disk drive unit 3116, a signal generation device 3118, such as a speaker or remote control, and a network interface device 3120.

In a particular embodiment, as depicted in FIG. 31, the disk drive unit 3116 may include a computer-readable medium 3122 in which one or more sets of instructions 3124, e.g. software, can be embedded. Further, the instructions 3124 may embody one or more of the methods or logic as described herein. In a particular embodiment, the instructions 3124 may reside completely, or at least partially, within the main memory 3104, the static memory 3106, and/or within the processor 3102 during execution by the computer system 3100. The main memory 3104 and the processor 3102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 3124 or receives and executes instructions 3124 responsive to a propagated signal, so that a device connected to a network 3126 can communicate voice, video or data over the network 3126. Further, the instructions 3124 may be transmitted or received over the network 3126 via the network interface device 3120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for managing a plurality of service level agreements, comprising:
    a switched metro Ethernet network having the plurality of service level agreements;
    a service level agreement management reporting system;
    a performance engine data filter coupled to the service level agreement-management reporting system; and
    a plurality of network elements connected to the performance engine data filter, wherein the service level agreement-management reporting system is configured to receive customer information including a customer Internet Protocol address for a customer associated with a plurality of customer claims, to validate locations of the network elements, to ping the network elements to create performance data, to determine whether a service level agreement violation is inside a customer location, to receive the performance data from the performance engine data filter, at least partially based on the performance data to validate the customer claims regarding the service level agreement violation, to contact the customer to create an appointment with the customer to perform intrusive testing when the SLA violation is inside the customer location, and to dispatch a technician when the service level agreement violation is outside the customer location.

2. The system of claim 1, further comprising:
    an inventory management module coupled to the service level agreement-management reporting system, wherein the inventory management module is configured to exchange the customer information with the service level agreement-management reporting system.

3. The system of claim 2, further comprising:
    a repair data module connected to the service level agreement-management reporting system, wherein the repair data module is configured to exchange trouble ticket information with the service level agreement-management reporting system.

4. The system of claim 1, wherein the service level agreement-management reporting system includes a computer program comprising:
    logic to receive a report from a customer regarding a service level agreement violation; and
    logic to determine a type of service level agreement violation reported, wherein the type can include one of a packet delivery rate violation, a jitter violation, a latency violation, a network availability violation, and a combination thereof.

5. The system of claim 4, wherein the computer program further comprises:
    logic to monitor service level agreement metrics for a predetermined time period, when the service level agreement violation is one of the packet delivery rate violation, the jitter violation, the latency violation, and a combination thereof.

6. The system of claim 5, wherein the computer program further comprises:
    logic to monitor a service level agreement for a predetermined time period.

7. The system of claim 6, wherein the computer program further comprises:
    logic to determine whether a service level agreement problem is corrected.

8. The system of claim 7, wherein the computer program further comprises:
logic to notify the customer that the service level agreement problem is corrected.

9. The system of claim 6, wherein the computer program further comprises:
logic to notify the customer that a service level agreement was missed and a service credit of a percentage of management reporting system for all affected ports will be credited in a next bill.

10. The system of claim 9, wherein the computer program further comprises:
logic to calculate an amount of credit; and
logic to apply the amount of credit to a bill for the customer.

11. The system of claim 4, wherein the computer program further comprises:
logic to notify the customer that a service level agreement was missed and a service credit of a percentage of management reporting system for all affected ports will be credited in a next bill, when the service level agreement is a network availability.

12. The system of claim 11, wherein the computer program further comprises:
logic to calculate an amount of credit; and
logic to apply the amount of credit to a bill for the customer.

13. A method for managing a plurality of service level agreements, the method comprising:
receiving a report from a customer regarding a service level agreement violation associated with a switched metro Ethernet network in a service level agreement-management reporting system;
determining, by the service level agreement-management reporting system, a type of service level agreement violation reported, wherein the type can include one of packet delivery rate, jitter, latency, network availability, and a combination thereof;
determining that intrusive testing is required for the service level agreement violation;
contacting the customer to create an appointment with the customer to perform the intrusive testing; and
dispatching a technician to perform the intrusive testing and to repair a problem with the switched metro Ethernet network that is causing the service level agreement violation.

14. The method of claim 13, further comprising monitoring a plurality of service level agreement metrics for a predetermined time period, when the service level agreement is one of packet delivery rate, jitter, latency, and a combination thereof.

15. The method of claim 14, further comprising monitoring a service level agreement for a predetermined time period.

16. The method of claim 15, further comprising determining whether a service level agreement problem is corrected.

17. The method of claim 16, further comprising notifying the customer that the service level agreement problem is corrected.

18. The method of claim 17, further comprising notifying the customer that a service level agreement was missed and a service credit of a percentage of management reporting system for all affected ports will be credited in a next bill.

19. The method of claim of claim 18, further comprising:
calculating an amount of credit; and
applying the amount of credit to a bill for the customer.

20. The method of claim 13, further comprising notifying the customer that a service level agreement was missed and a service credit of a percentage of management reporting system for all affected ports will be credited in a next bill, when the service level agreement is a network availability.

21. The method of claim 20, further comprising:
calculating an amount of credit; and
applying the amount of credit to a bill for the customer.

22. A computer program stored on a non-transitory computer-readable medium for managing a plurality of service level agreements associated with a switched metro Ethernet network, the computer program comprising:
logic to receive a report from a customer regarding a service level agreement violation;
logic to determine a type of service level agreement violation reported, wherein the type can include one of packet delivery rate, jitter, latency, network availability, and a combination thereof;
logic to determine whether the type of service level agreement violation reported is a customer impacting violation; and
if the type of service level agreement violation is not a customer impacting violation:
logic to monitor a plurality of service level agreement metrics multiple times over a predetermined time period, when the service level agreement violation is one of packet delivery rate, jitter, latency, and a combination thereof; and
logic to determine that the SLA violation is corrected when the service level agreement metrics are continually correct over the predetermined time period;
otherwise:
logic to create a trouble ticket from information in the report from the customer;
logic to determine that the trouble ticket has been cleared; and
logic to notify the customer that the service level agreement violation has been cleared.

23. The computer program of claim 22, further comprising:
logic to monitor a service level agreement for a predetermined time period.

24. The computer program of claim 23, further comprising:
logic to determine whether a service level agreement problem is corrected.

25. The computer program of claim 24, further comprising:
logic to notify the customer that the service level agreement problem is corrected.

26. The computer program of claim 25, further comprising:
logic to notify the customer that a service level agreement was missed and a service credit of a percentage of management reporting system for all affected ports will be credited in a next bill.

27. The computer program of claim 26, further comprising:
logic to calculate an amount of credit; and
logic to apply the amount of credit to a bill for the customer.

28. The computer program of claim 22, further comprising:
logic to notify the customer that a service level agreement was missed and a service credit of a percentage of management reporting system for all affected ports will be credited in a next bill, when the service level agreement is a network availability.

29. The computer program of claim 28, further comprising:
logic to calculate an amount of credit; and
logic to apply the amount of credit to a bill for the customer.

* * * * *